(12) United States Patent
Matsuzaki et al.

(10) Patent No.: US 11,094,284 B2
(45) Date of Patent: Aug. 17, 2021

(54) REARRANGING COLUMNS AND ROWS OF TWO-DIMENSIONAL IMAGE PIXEL DATA

(71) Applicant: EIZO Corporation, Ishikawa (JP)

(72) Inventors: Hiroki Matsuzaki, Ishikawa (JP); Masato Yamamoto, Ishikawa (JP); Takashi Nakamae, Ishikawa (JP); Tsubasa Ito, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 16/623,968

(22) PCT Filed: Jun. 26, 2018

(86) PCT No.: PCT/JP2018/024109
§ 371 (c)(1),
(2) Date: Dec. 18, 2019

(87) PCT Pub. No.: WO2019/012980
PCT Pub. Date: Jan. 17, 2019

(65) Prior Publication Data
US 2020/0175942 A1    Jun. 4, 2020

(30) Foreign Application Priority Data

Jul. 10, 2017    (JP) .............................. JP2017-135031

(51) Int. Cl.
*G09G 5/02* (2006.01)
*G06T 1/20* (2006.01)
*G09G 5/10* (2006.01)

(52) U.S. Cl.
CPC ................ *G09G 5/02* (2013.01); *G06T 1/20* (2013.01); *G09G 5/10* (2013.01); *G09G 2330/023* (2013.01)

(58) Field of Classification Search
None
See application file for complete search history.

(56) References Cited

U.S. PATENT DOCUMENTS

2001/0045932 A1    11/2001 Mukao
2004/0041765 A1    3/2004 Koyama et al.
(Continued)

FOREIGN PATENT DOCUMENTS

JP    2001-242839 A    9/2001
JP    2004-118183 A    4/2004
(Continued)

OTHER PUBLICATIONS

International Search Report dated Jul. 31, 2018 in corresponding International Application No. PCT/JP2018/024109; 4 pages.
(Continued)

*Primary Examiner* — Edward Martello
(74) *Attorney, Agent, or Firm* — Maier & Maier, PLLC

(57) ABSTRACT

An image processing device and image processing method that reduce the probability that the power consumption of two processing systems will be maximized simultaneously. Such image processing device includes an image processing circuit, a conversion circuit receiving a first pixel data array outputted from the image processing circuit and converting the first pixel data array into a second pixel data array by converting an arrangement of pieces of pixel data included in the first pixel data array pixel by pixel, the first pixel data array being an aggregate of a plurality of pieces of pixel data, the pieces of pixel data being pieces of data corresponding to a plurality of pixels, each of the pieces of pixel data having a plurality of bits, an aggregate of the pixels forming a pixel array, and a processing unit processing the second pixel data array outputted from the conversion circuit.

4 Claims, 27 Drawing Sheets

(56) References Cited

U.S. PATENT DOCUMENTS

| | | | | |
|---|---|---|---|---|
| 2007/0009181 | A1* | 1/2007 | Leung | G06T 3/606 |
| | | | | 382/296 |
| 2012/0246360 | A1 | 9/2012 | Tsuchida et al. | |
| 2015/0326808 | A1 | 11/2015 | Sekine | |

FOREIGN PATENT DOCUMENTS

| | | |
|---|---|---|
| JP | 2011-020276 A | 2/2011 |
| JP | 2012-203542 A | 10/2012 |
| JP | 2013-175897 A | 9/2013 |
| JP | 2015-050604 A | 3/2015 |
| JP | 2015-216454 A | 12/2015 |

OTHER PUBLICATIONS

Japanese Office Action dated Oct. 5, 2017 in corresponding Japanese Application No. 2017-135031; 10 pages.
Japanese Office Action dated Feb. 20, 2018 in corresponding Japanese Application No. 2017-135031; 4 pages.

\* cited by examiner

FIG.1 FIRST EMBODIMENT

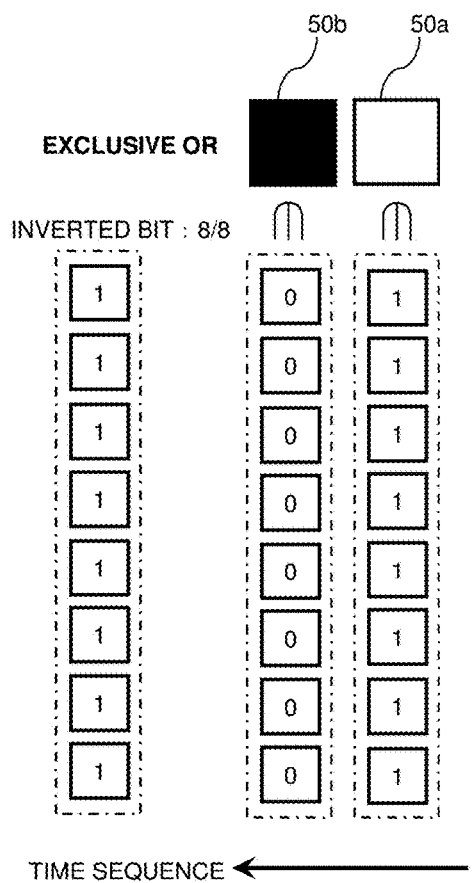
FIG.4A ALL INVERSION (POWER CONSUMPTION: HIGH)
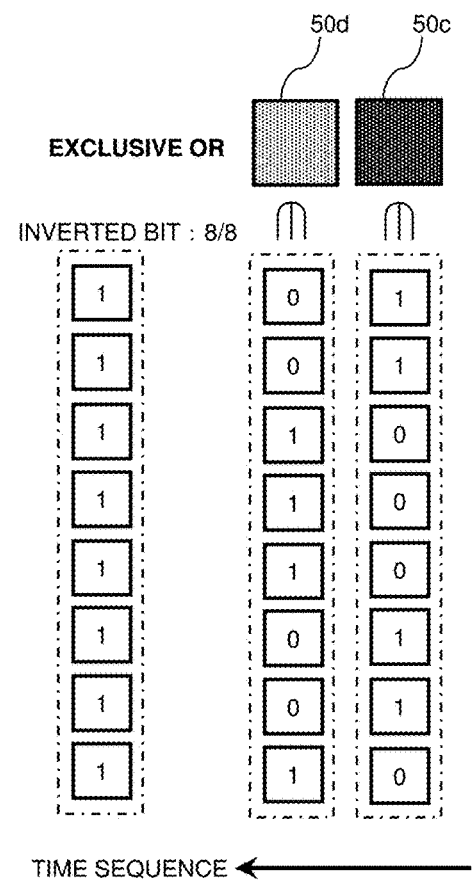
FIG.4B ALL INVERSION (POWER CONSUMPTION: HIGH)

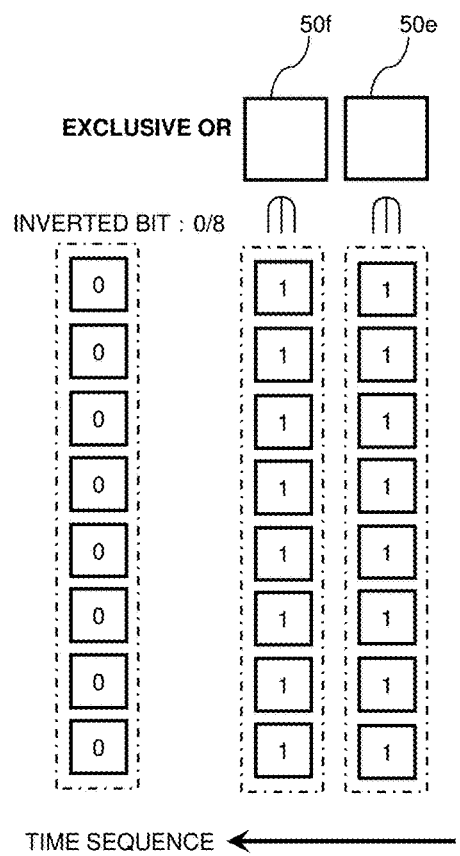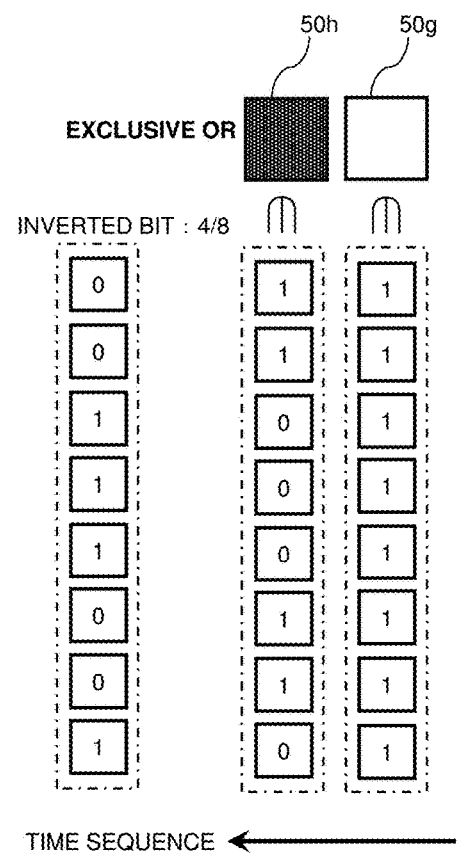

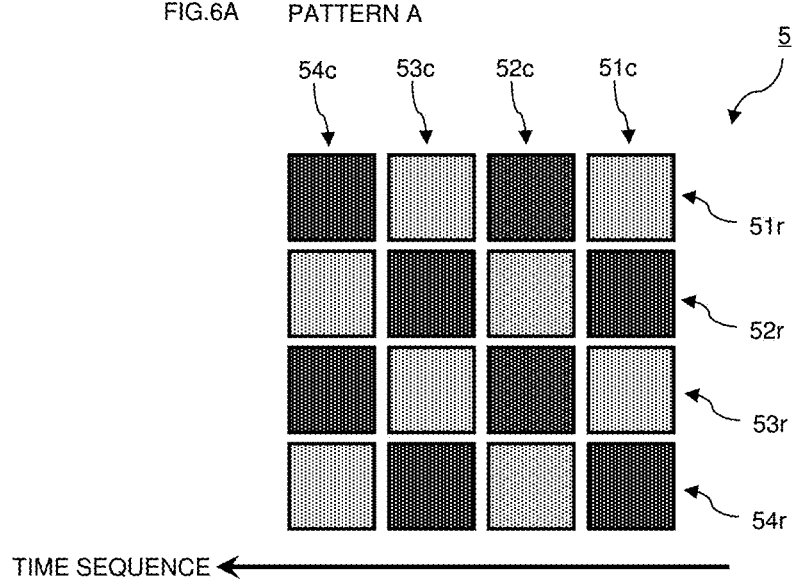
FIG.6A PATTERN A
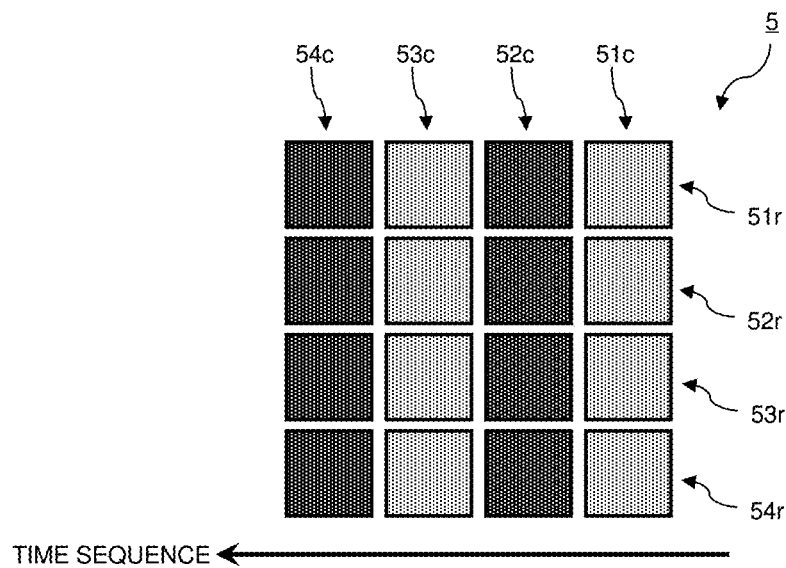
FIG.6B PATTERN B

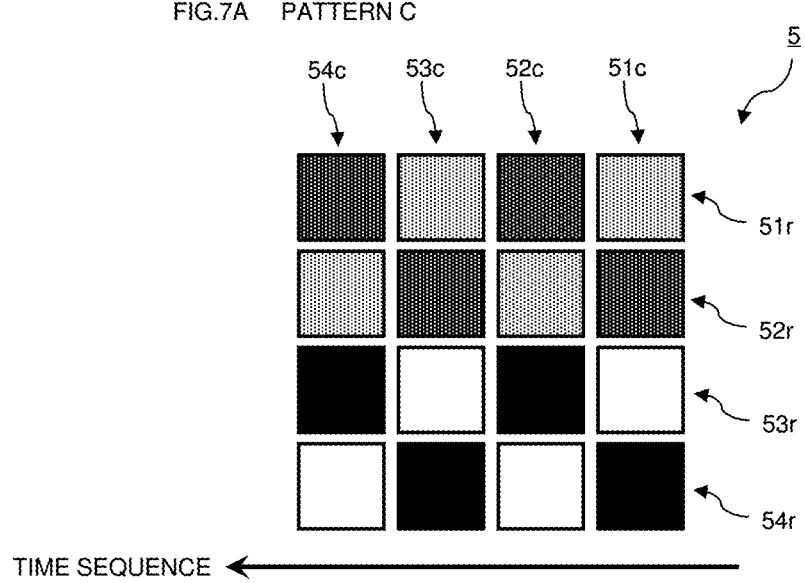
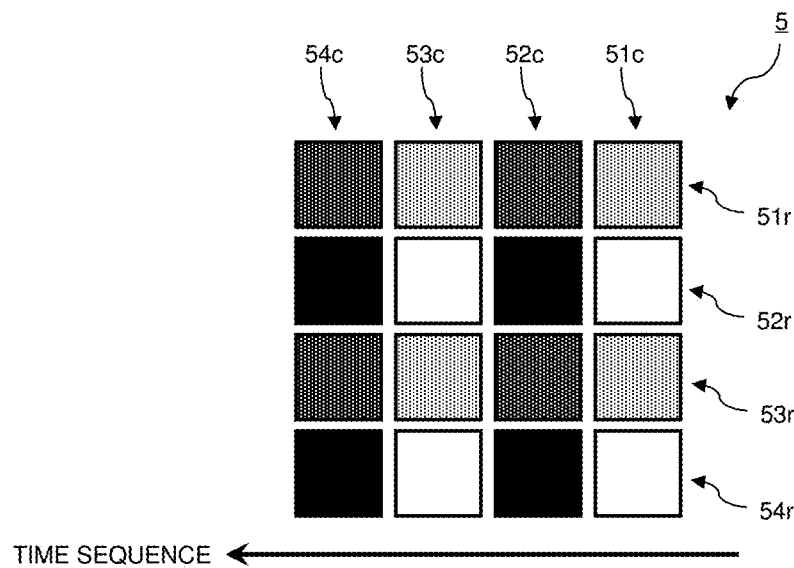

FIG.8A YET-TO-BE-CONVERTED
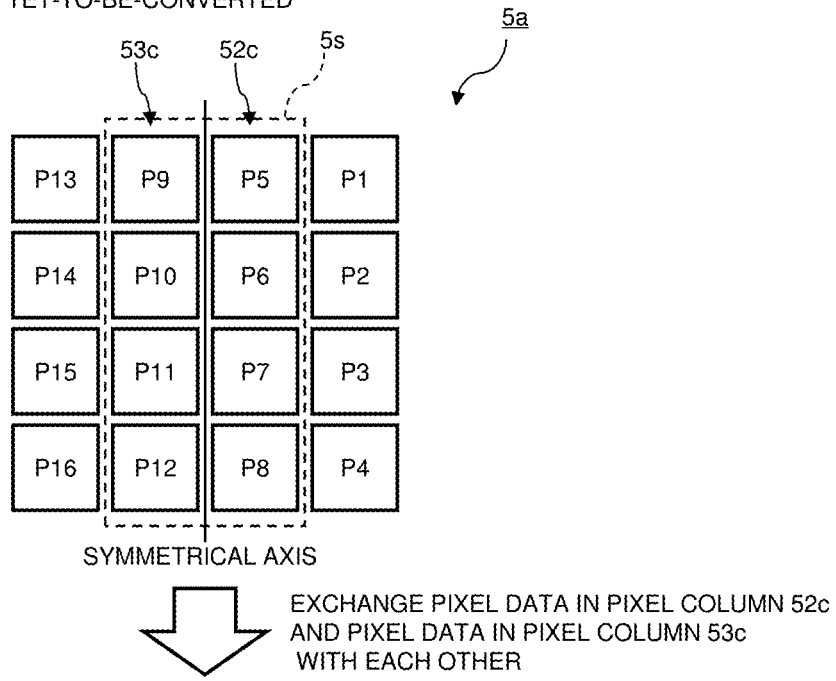
EXCHANGE PIXEL DATA IN PIXEL COLUMN 52c
AND PIXEL DATA IN PIXEL COLUMN 53c
WITH EACH OTHER
FIG.8B CONVERTED
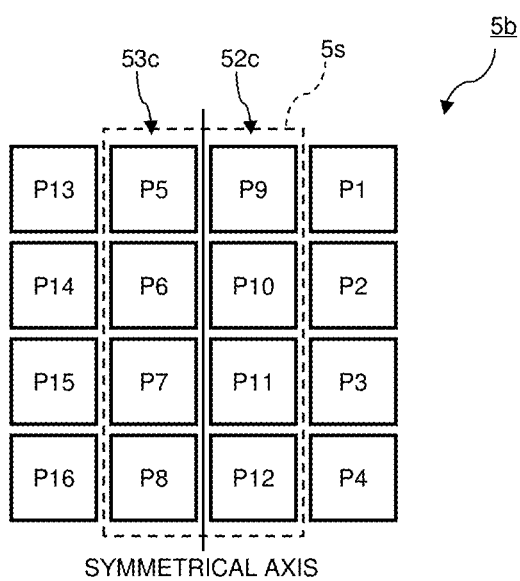

FIG.9A  PATTERN A YET-TO-BE-CONVERTED
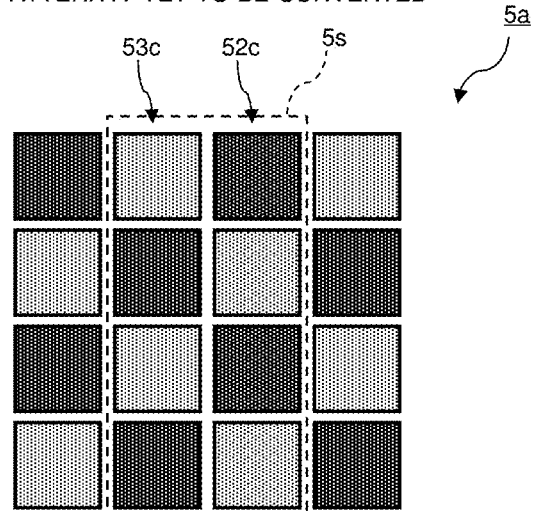
ALL INVERSION IN EACH PIXEL ROW: THREE TIMES
 EXCHANGE PIXEL DATA IN PIXEL COLUMN 52c AND PIXEL DATA IN PIXEL COLUMN 53c WITH EACH OTHER
FIG.9B  PATTERN A CONVERTED
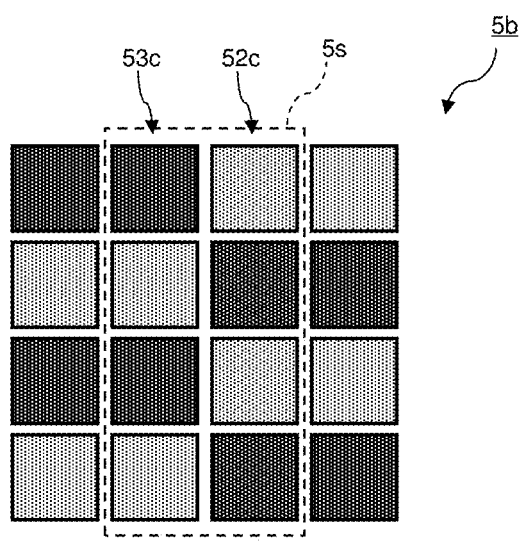
ALL INVERSION IN EACH PIXEL ROW: ONCE FIG.10A  PATTERN B  YET-TO-BE-CONVERTED
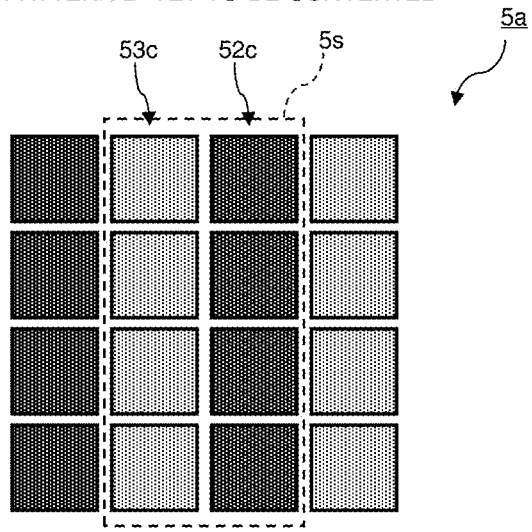
ALL INVERSION IN EACH PIXEL ROW: THREE TIMES
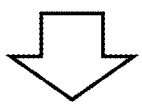   EXCHANGE PIXEL DATA IN PIXEL COLUMN 52c
AND PIXEL DATA IN PIXEL COLUMN 53c
WITH EACH OTHER
FIG.10B  PATTERN B  CONVERTED
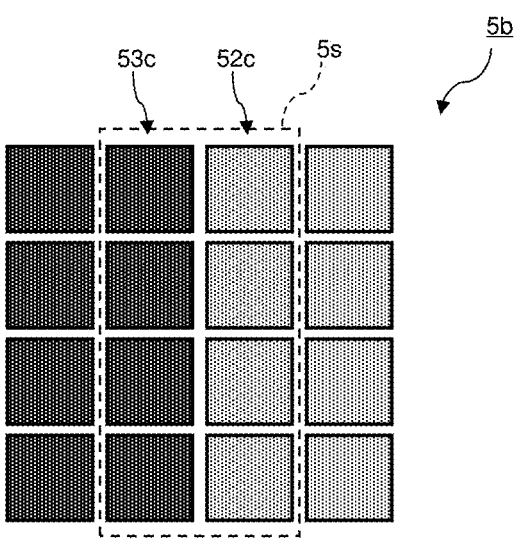
ALL INVERSION IN EACH PIXEL ROW: ONCE FIG.11A  PATTERN C  YET-TO-BE-CONVERTED
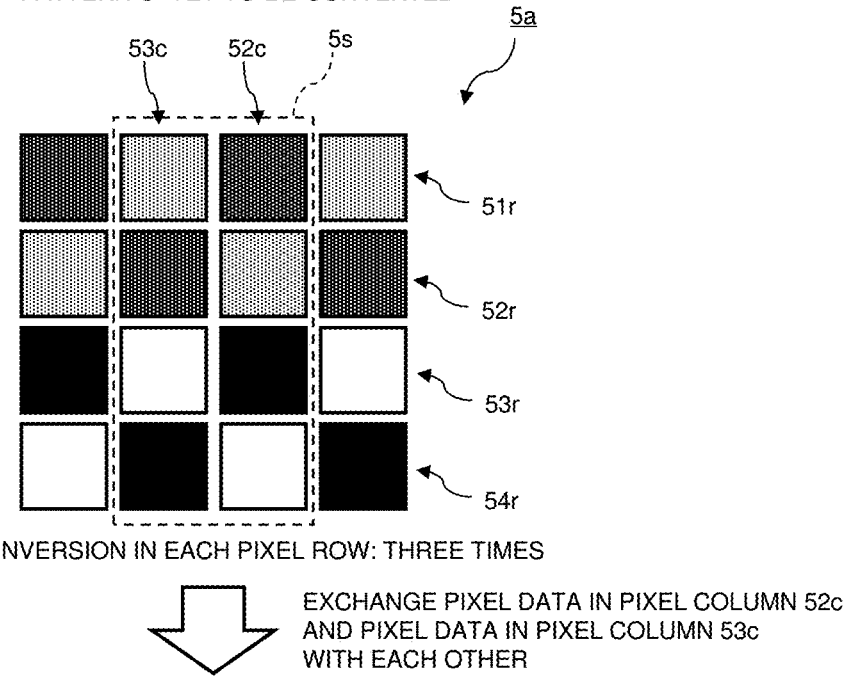
ALL INVERSION IN EACH PIXEL ROW: THREE TIMES
EXCHANGE PIXEL DATA IN PIXEL COLUMN 52c
AND PIXEL DATA IN PIXEL COLUMN 53c
WITH EACH OTHER
FIG.11B  PATTERN C  CONVERTED
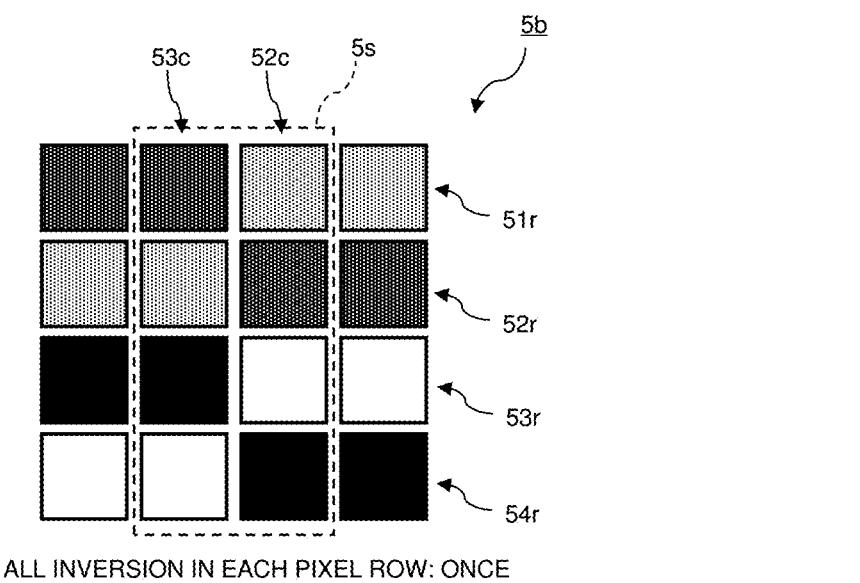
ALL INVERSION IN EACH PIXEL ROW: ONCE FIG.12A PATTERN D YET-TO-BE-CONVERTED
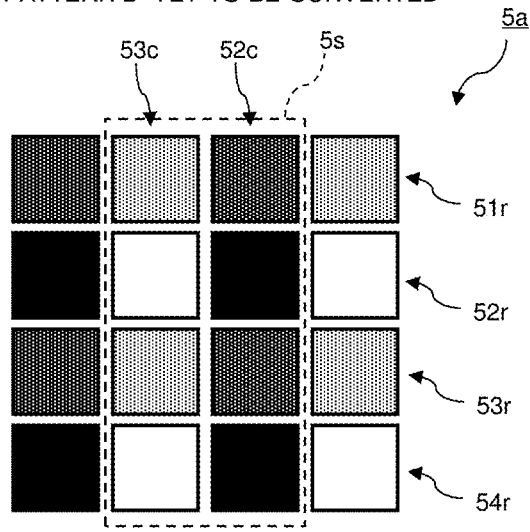
ALL INVERSION IN EACH PIXEL ROW: THREE TIMES
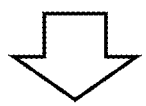
EXCHANGE PIXEL DATA IN PIXEL COLUMN 52c
AND PIXEL DATA IN PIXEL COLUMN 53c
WITH EACH OTHER
FIG.12B PATTERN D CONVERTED
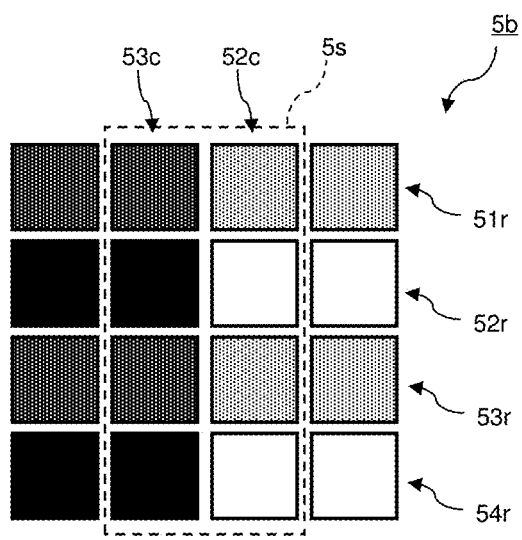
ALL INVERSION IN EACH PIXEL ROW: ONCE FIG.13A  YET-TO-BE-CONVERTED
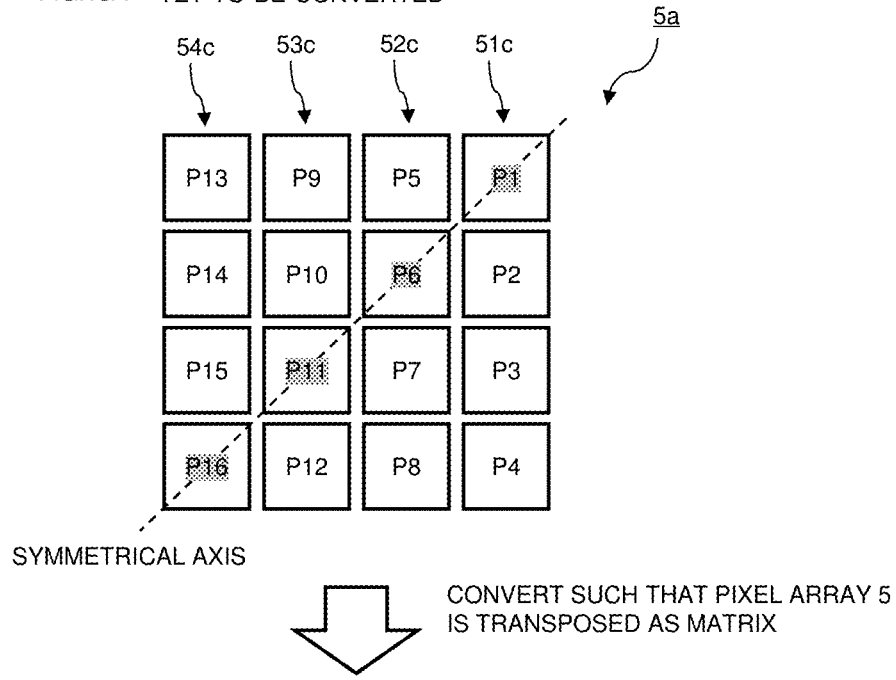
SYMMETRICAL AXIS
CONVERT SUCH THAT PIXEL ARRAY 5 IS TRANSPOSED AS MATRIX
FIG.13B  CONVERTED
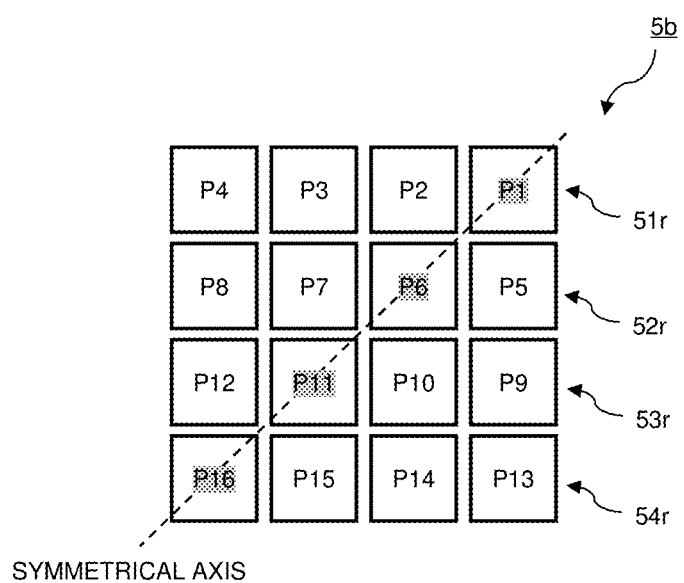
SYMMETRICAL AXIS FIG.14A  PATTERN A YET-TO-BE-CONVERTED
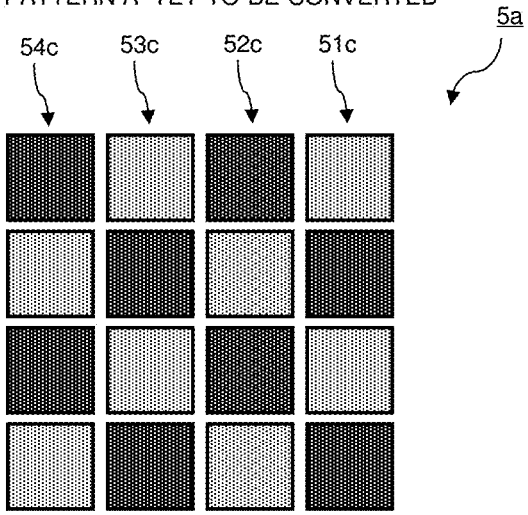
ALL INVERSION IN EACH PIXEL ROW: THREE TIMES
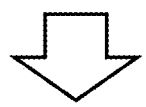 CONVERT SUCH THAT PIXEL ARRAY 5 IS TRANSPOSED AS MATRIX
FIG.14B  PATTERN A CONVERTED
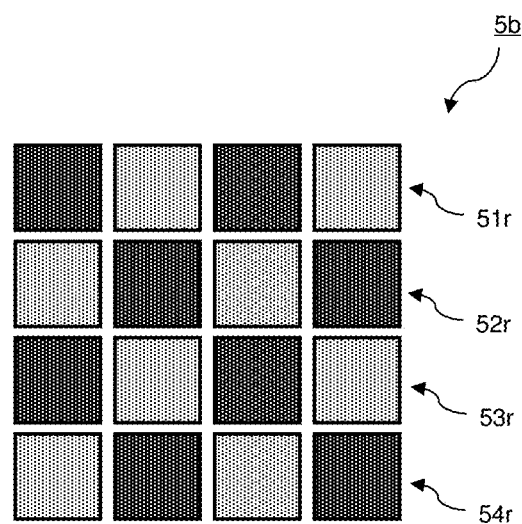
ALL INVERSION IN EACH PIXEL ROW: THREE TIMES FIG.15A  PATTERN B  YET-TO-BE-CONVERTED
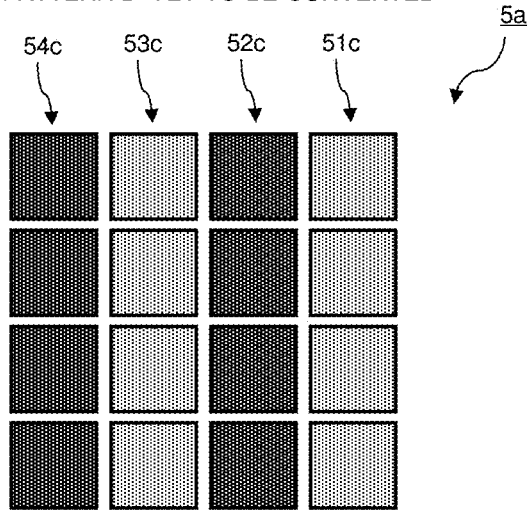
ALL INVERSION IN EACH PIXEL ROW: THREE TIMES
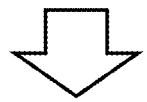
CONVERT SUCH THAT PIXEL ARRAY 5 IS TRANSPOSED AS MATRIX
FIG.15B  PATTERN B  CONVERTED
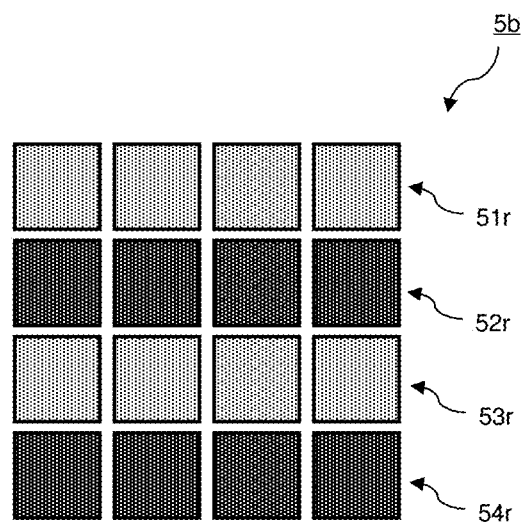
ALL INVERSION IN EACH PIXEL ROW: ZERO TIME FIG.16A  PATTERN C YET-TO-BE-CONVERTED
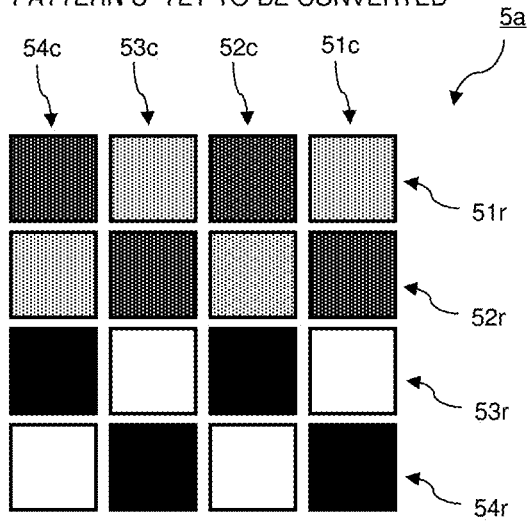
ALL INVERSION IN EACH PIXEL ROW: THREE TIMES
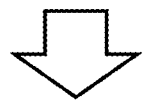
CONVERT SUCH THAT PIXEL ARRAY 5 IS TRANSPOSED AS MATRIX
FIG.16B  PATTERN C CONVERTED
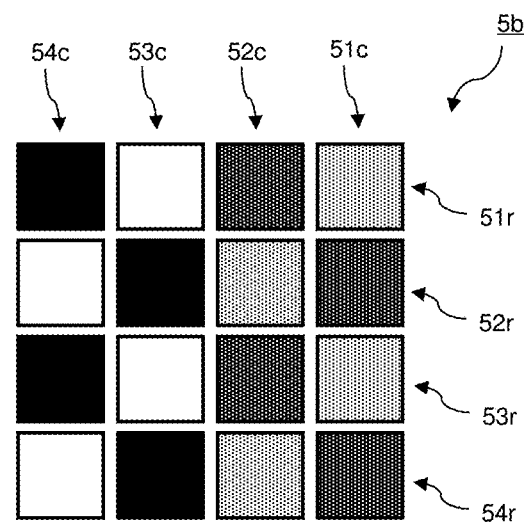
ALL INVERSION IN EACH PIXEL ROW: TWICE, PARTIAL INVERSION: ONCE FIG.17A PATTERN D YET-TO-BE-CONVERTED
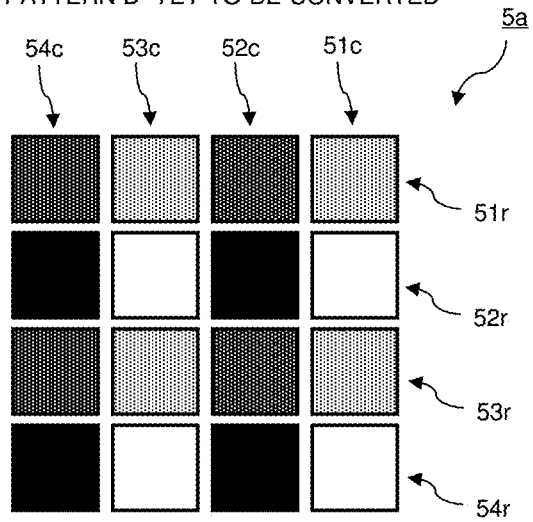
ALL INVERSION IN EACH PIXEL ROW: THREE TIMES
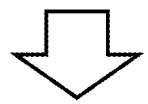
CONVERT SUCH THAT PIXEL ARRAY 5 IS TRANSPOSED AS MATRIX
FIG.17B PATTERN D CONVERTED
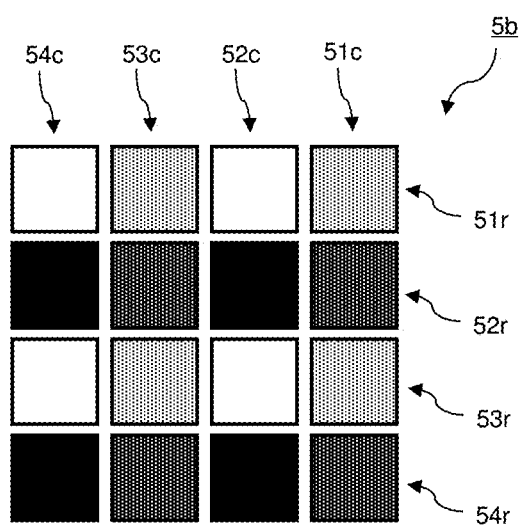
PARTIAL INVERSION IN EACH PIXEL ROW: THREE TIMES FIG.18A  PATTERN A2
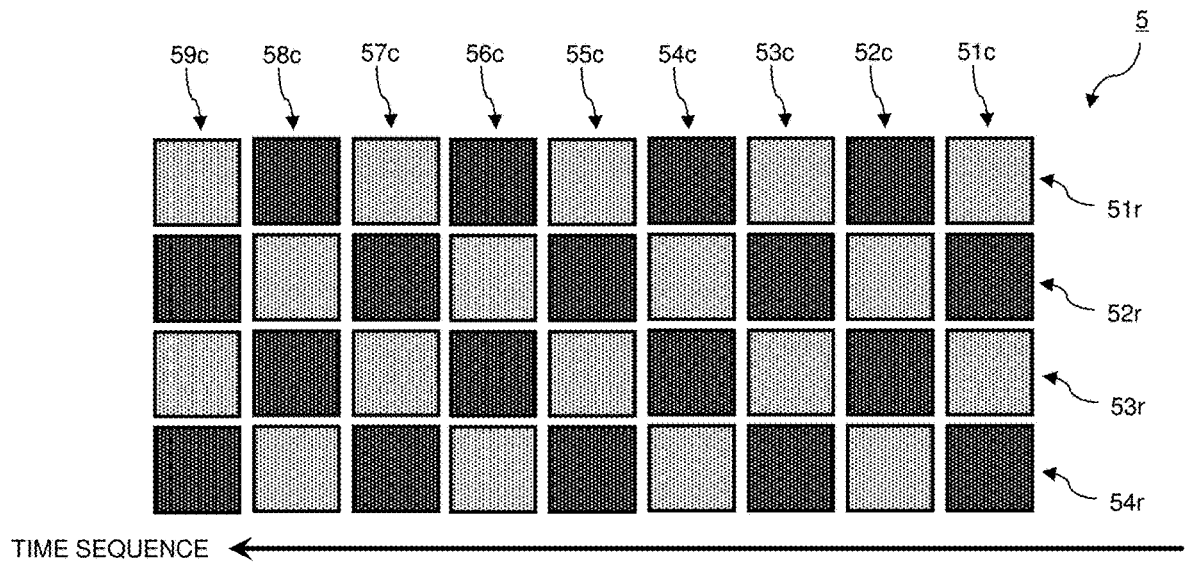
FIG.18B  PATTERN B2
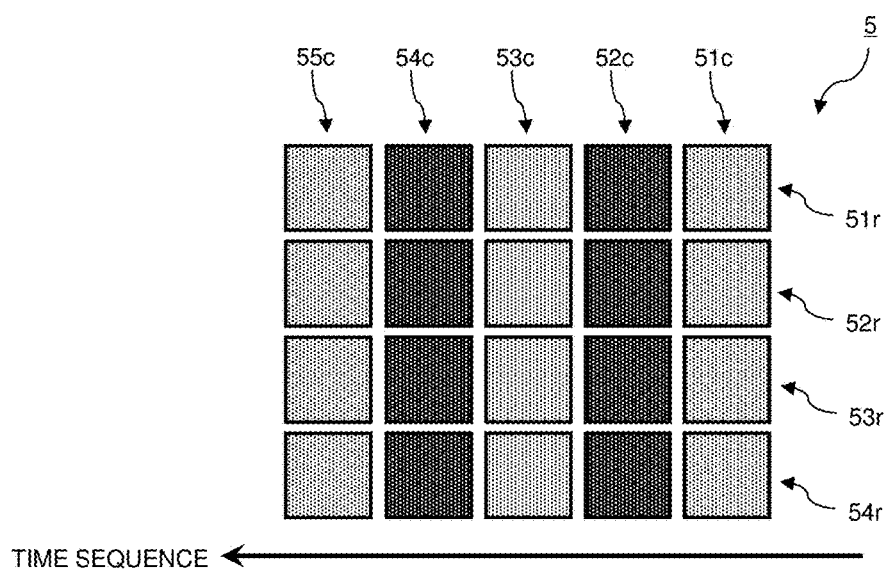

FIG.19A  PATTERN A2  YET-TO-BE-CONVERTED
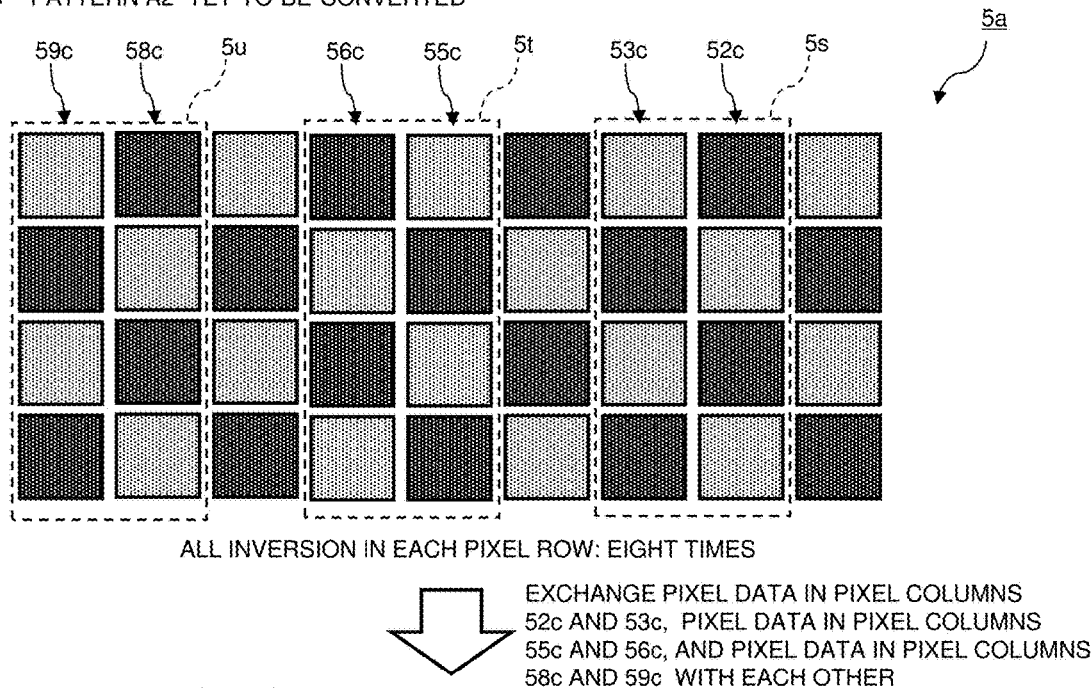
ALL INVERSION IN EACH PIXEL ROW: EIGHT TIMES
EXCHANGE PIXEL DATA IN PIXEL COLUMNS 52c AND 53c, PIXEL DATA IN PIXEL COLUMNS 55c AND 56c, AND PIXEL DATA IN PIXEL COLUMNS 58c AND 59c WITH EACH OTHER
FIG.19B  PATTERN A2  CONVERTED
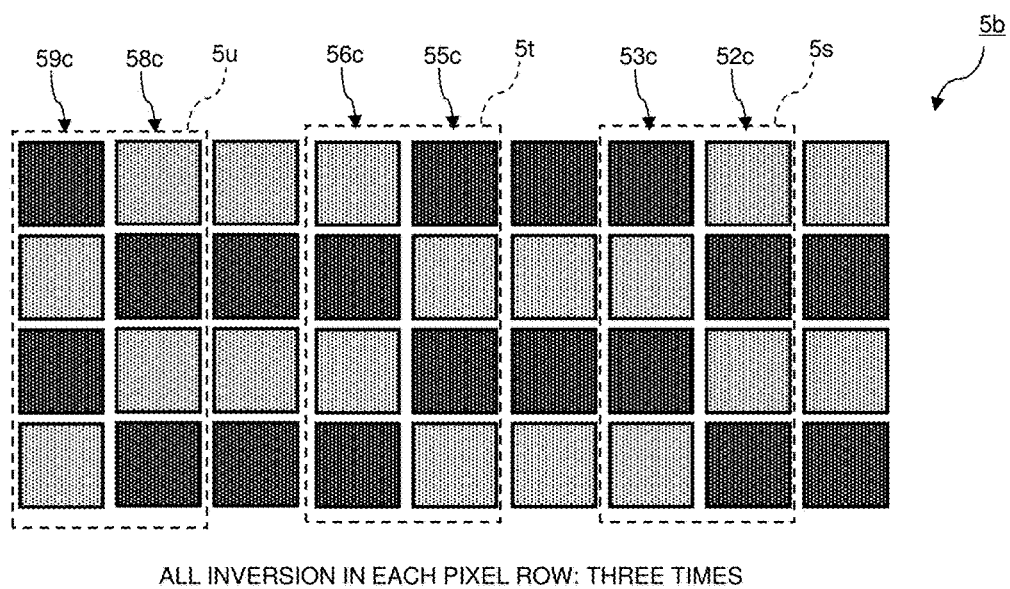
ALL INVERSION IN EACH PIXEL ROW: THREE TIMES FIG.20A  PATTERN B  YET-TO-BE-CONVERTED
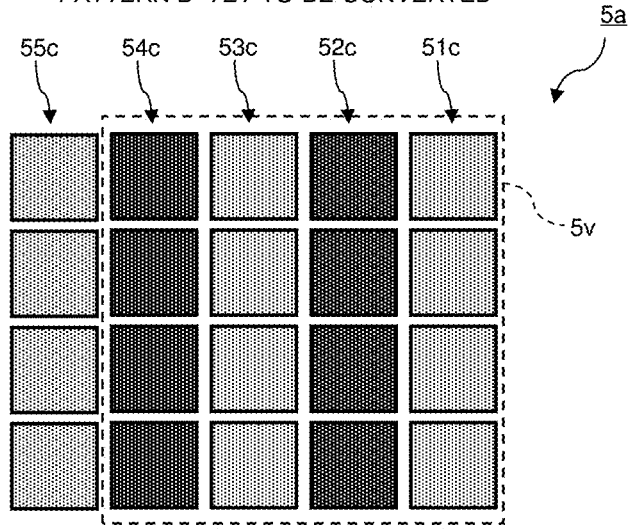
ALL INVERSION IN EACH PIXEL ROW: FOUR TIMES
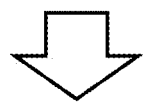
EXCHANGE PIXEL DATA IN PIXEL COLUMN 52c
AND PIXEL DATA IN PIXEL COLUMN 53c
WITH EACH OTHER
FIG.20B  PATTERN B  CONVERTED
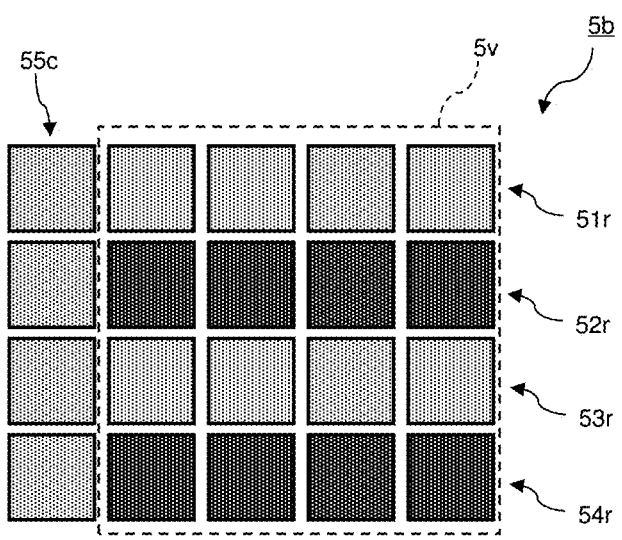
ALL INVERSION IN EACH PIXEL ROW: ZERO TIME OR ONCE FIG.22A  YET-TO-BE-CONVERTED
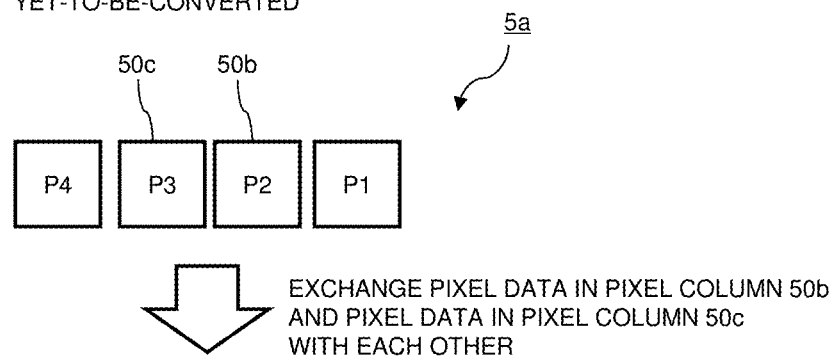
EXCHANGE PIXEL DATA IN PIXEL COLUMN 50b
AND PIXEL DATA IN PIXEL COLUMN 50c
WITH EACH OTHER
FIG.22B  CONVERTED
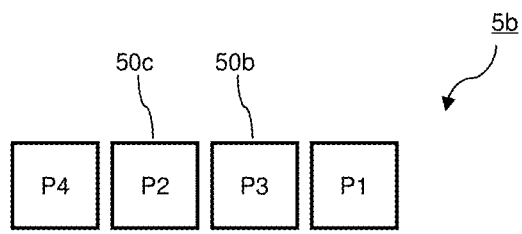

FIG.23A  YET-TO-BE-CONVERTED (ALL INVERSION: THREE TIMES)
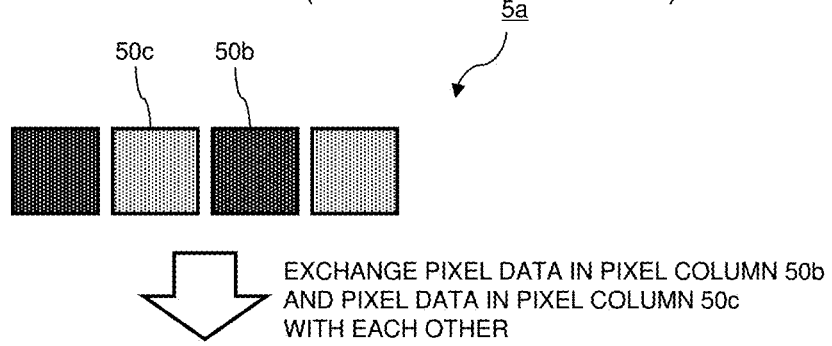
EXCHANGE PIXEL DATA IN PIXEL COLUMN 50b
AND PIXEL DATA IN PIXEL COLUMN 50c
WITH EACH OTHER
FIG.23B  CONVERTED (ALL INVERSION: ONCE)
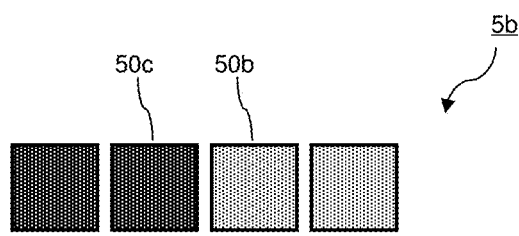

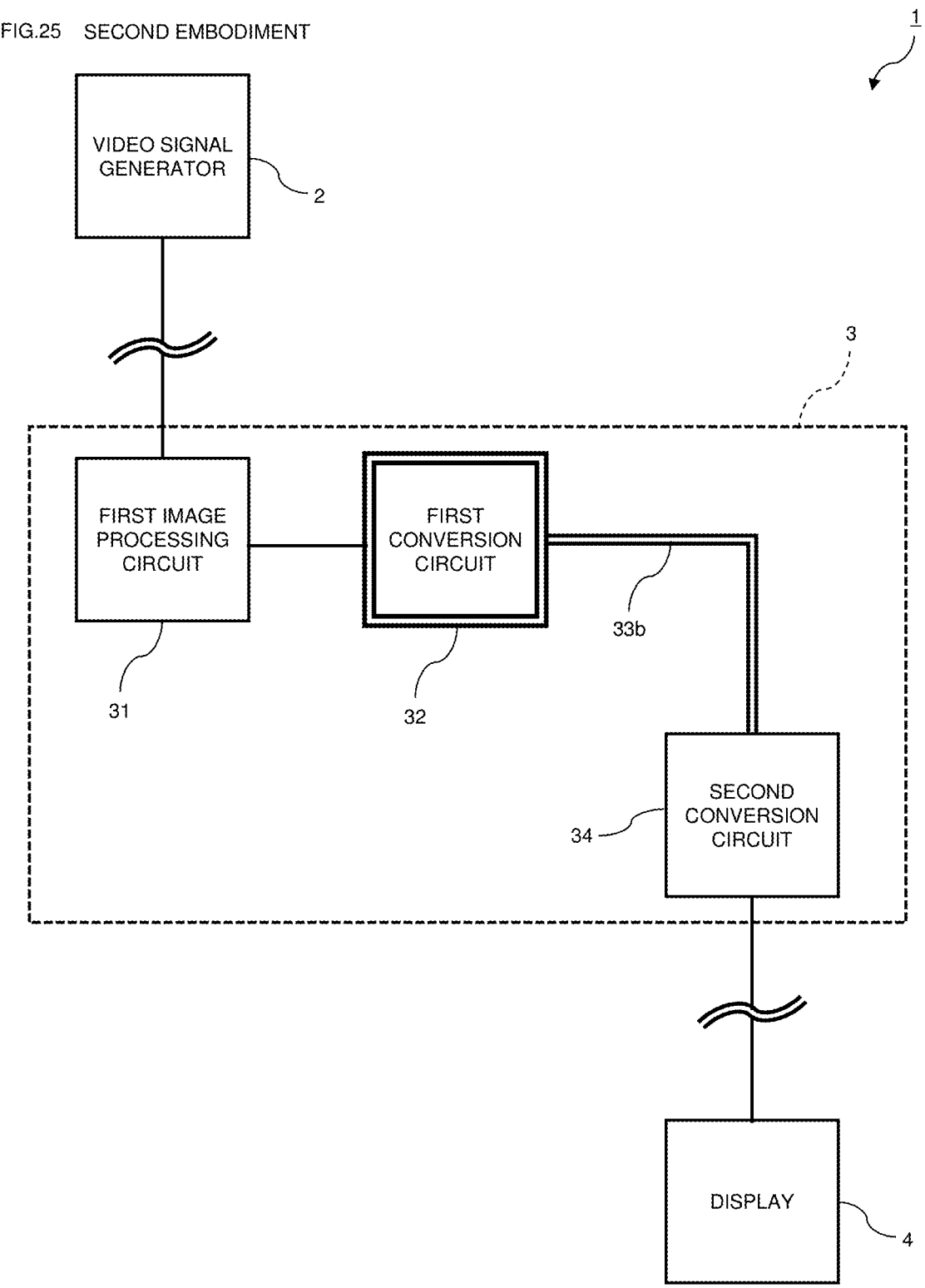
FIG.25 SECOND EMBODIMENT

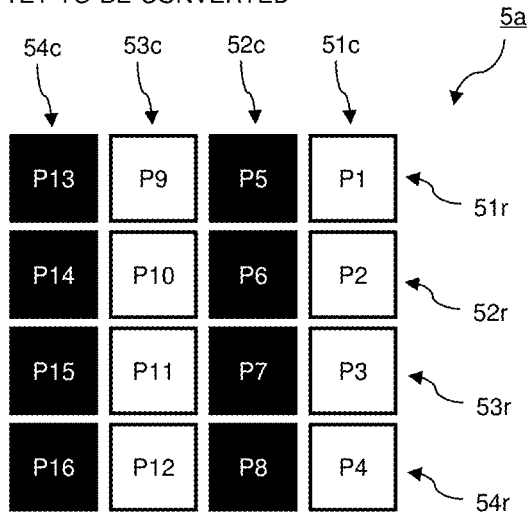
FIG.26A YET-TO-BE-CONVERTED
ALL INVERSION IN EACH PIXEL ROW: THREE TIMES
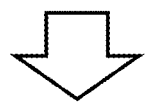 REARRANGE IN ACCORDANCE WITH RULE
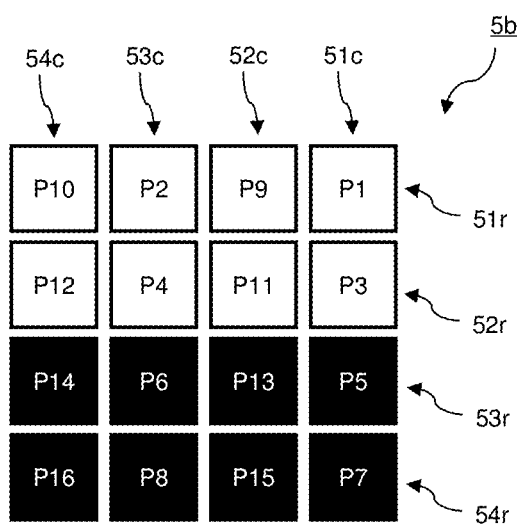
FIG.26B CONVERTED
ALL INVERSION IN EACH PIXEL ROW: ZERO TIME FIG.27A YET-TO-BE-CONVERTED
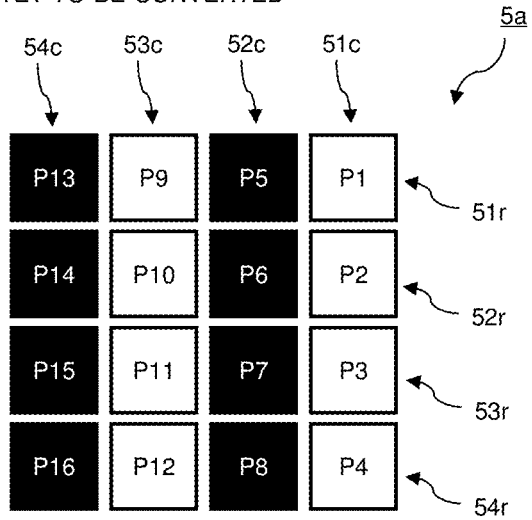
ALL INVERSION IN EACH PIXEL ROW: THREE TIMES
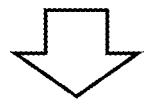 REARRANGE IN ACCORDANCE WITH RULE
FIG.27B CONVERTED
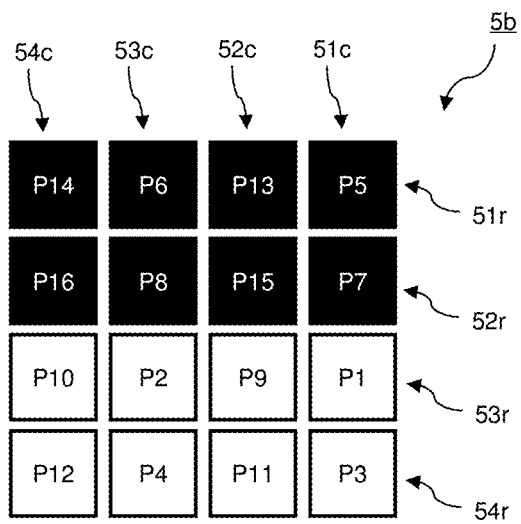
ALL INVERSION IN EACH PIXEL ROW: ZERO TIME

REARRANGING COLUMNS AND ROWS OF TWO-DIMENSIONAL IMAGE PIXEL DATA

FIELD

The present invention relates to an image processing device and image processing method.

BACKGROUND

Image processing devices that perform image processing are being used in various fields. For example, an image processing device is included in a display (LCD display or the like) that displays images. Almost all of data handled by an image processing device is pixel data relating to pixels that form images. Specifically, for example, pixel data corresponding to one pixel has the amount of information of multiple bits representing the luminance value. Typically, such pixel data has the amount of information of 8 bits (0 to 255) for monochrome or the amount of information of 24 bits for RGB colors (0 to 255 for each of RGB) (both are binary numbers). However, an image visible by a human is an aggregate of pixels (hereafter referred to as a "pixel array") and is displayed pixel by pixel. For this reason, processing relating to an image processing device (image processing, communication processing, and the like) is typically performed pixel by pixel (see Patent Literature 1).

CITATION LIST

Patent Literature

Patent Literature 1: Japanese Unexamined Patent Application Publication No. 2011-020276

SUMMARY

Recent image processing devices include various image processing circuits (including FPGA/ASIC and the like), a communication system, and the like and have a complicated configuration. In particular, depending on an input image, a processing system may consume a large amount of power. The increase in power consumption increases the amount of generated heat, which causes a major problem of an increase in the temperature of the image processing device. To solve this problem, measures are taken, such as increasing the effect of radiating heat from the device by mounting a radiating fin or the like on the device. However, such measures cause problems that lead to an increase in cost, difficulty in designing the device for heat radiation, and a shortened life of the image processing device.

In recent years, it has been recognized that the power consumption of the image processing device which processes an image pixel by pixel increases when a pixel array relating to an image to be handled has a particular pattern. One example is a case in which white pixels and black pixels are processed alternately in serial (details will be described later). In particular, when such a pixel array is processed by multiple processing systems (including an image processing circuit, a communication system, and the like), power consumption may increase.

The present invention has been made in view of the foregoing, and an object thereof is to provide an image processing device and image processing method that reduce the probability that the power consumption of two processing systems will be maximized simultaneously.

An aspect of the present invention provides an image processing device including an image processing circuit, a conversion circuit configured to receive a first pixel data array outputted from the image processing circuit and to convert the first pixel data array into a second pixel data array by converting an arrangement of pieces of pixel data included in the first pixel data array pixel by pixel, the first and second pixel data array each being an aggregate of multiple pieces of pixel data, the pieces of pixel data being data corresponding to pieces of pixels, the pixel data comprising a plurality of bits, an aggregate of the pixels forming a pixel array, and a processing unit configured to process the second pixel data array outputted from the conversion circuit.

The image processing device according to this aspect is characterized in that the conversion circuit converts the first pixel data array into the second pixel data array by converting the arrangement of pieces of pixel data included the first pixel data array pixel by pixel. Thus, the image processing device is able to reduce the probability that the power consumption of the two processing systems (e.g., the image processing circuit, a communication bus, a first image processing circuit, a second image processing circuit, and the like) preceding and following the conversion circuit will be maximized simultaneously.

Various embodiments of the present invention are described below. Any of the embodiments described below can be combined with one another.

Preferably, the conversion is a first conversion circuit, the image processing device further includes a second conversion circuit, and the second conversion circuit receives the second pixel data array from the processing unit and reconverts the second pixel data array into the first pixel data array.

Preferably, the image processing circuit is a first image processing circuit, and the processing unit is a second image processing circuit and performs, on the second pixel data array outputted from the first conversion circuit, image processing that does not depend on the positional relationships among pieces of pixel data in the second pixel data array.

Preferably, the pixel array is a two-dimensional array including M×N pixels, M satisfying M≥2, N satisfying N≥2, and the first conversion circuit is configured to perform the converting by processing M pieces of pixel data in parallel N times, the M pieces of pixel data being column data.

Preferably, M=N is satisfied.

Preferably, the first conversion circuit converts the first pixel data array into the second pixel data array by exchanging multiple pieces of column data in the first pixel data array with one another and outputs the second pixel data array.

Preferably, the plurality of the pieces of column data are adjacent to one another.

Preferably, the pieces of column data adjacent to one another are the (3k−1)th column data and the (3k)th column data, k satisfying 1≤k≤[N/3], [ ] being Gauss's notation.

Preferably, the first conversion circuit converts the first pixel data array into the second pixel data array by transposing a square matrix that is all or part of the first pixel data array and outputs the second pixel data array.

Preferably, the pixel data array is a one-dimensional array comprising N pixels, N satisfying N≥3, and the first conversion circuit is configured to perform the converting by processing each of N pieces of pixel data in serial.

Preferably, the first conversion circuit converts the first pixel data array into the second pixel data array by mutually exchanging pieces of pixel data adjacent to one another in the first pixel data array and outputs the second pixel data array.

Preferably, the pieces of pixel data adjacent to one another are the (3k−1)th pixel data and the (3k)th pixel data, k satisfying 1≤k≤[N/3], [ ] being Gauss's notation.

Another aspect of the present invention provides an image processing method including an image processing step, a conversion step of converting a first pixel data array outputted in the image processing step into a second pixel data array by converting an arrangement of pieces of pixel data included in the first pixel data array pixel by pixel, the first pixel data array being an aggregate of multiple pieces of pixel data, the pieces of pixel data being pieces of data corresponding to multiple pixels, each of the pieces of pixel data including multiple bits, an aggregate of the pixels forming a pixel array, and a processing step of processing the second pixel data array converted in the conversion step.

The image processing method according to this aspect is characterized in that the conversion step includes converting the first pixel data array into the second pixel data array by converting the arrangement of the pieces of pixel data included the first pixel data array pixel by pixel. Thus, the image processing method is able to reduce the probability that the power consumption of the two processing systems (e.g., an image processing circuit, a communication bus, a first image processing circuit, a second image processing circuit, and the like) preceding and following a conversion circuit used in the conversion step will be maximized simultaneously.

Various embodiments of the present invention are described below. Any of the embodiments described below can be combined with one another.

Preferably, the pixel array is a two-dimensional array including M×N pixels, M satisfying M≥2, N satisfying N≥2, and the converting includes processing M pieces of pixel data in parallel N times, the M pieces of pixel data being column data.

Preferably, the pixel data array is a one-dimensional array comprising N pixels, N satisfying N≥3, and the converting includes processing each of N pieces of pixel data in serial.

BRIEF DESCRIPTION OF THE DRAWINGS

FIGS. 4A and 4B are concept diagrams showing the toggle rate about the monochrome 8-bit pixel 50 shown in FIG. 3 and show cases in which the toggle rate is maximized.

FIGS. 5A and 5B are concept diagrams showing the toggle rate about the monochrome 8-bit pixels 50 shown in FIG. 3, in which FIG. 5A shows a case in which the toggle rate is minimized; and FIG. 5B shows a case in which the toggle rate becomes moderate.

FIGS. 6A and 6B show examples of a pixel array 5 whose toggle rate is maximized, in which FIG. 6A shows the pixel array 5 as a pattern A; and FIG. 6B shows the pixel array 5 as a pattern B.

FIGS. 7A and 7B show examples of a pixel array 5 whose toggle rate is maximized, in which FIG. 7A shows the pixel array 5 as a pattern C; and FIG. 7B shows the pixel array 5 as a pattern D.

FIGS. 8A and 8B are diagrams showing an example of conversion of a pixel array 5 by the first conversion circuit 32 according to the first and second embodiments of the present invention and showing conversion in which pieces of pixel data in a pixel column 52 and pieces of pixel data in a pixel column 53c are exchanged with one another, in which FIG. 8A shows a yet-to-be-converted pixel array 5a; and FIG. 8B shows a converted pixel array 5b.

FIGS. 9A and 9B are diagrams showing a case in which the conversion shown in FIGS. 8A and 8B is applied to a pixel array 5 having the pattern A, in which FIG. 9A shows a yet-to-be-converted pixel array 5a; and FIG. 9B shows a converted pixel array 5b.

FIGS. 10A and 10B are diagrams showing a case in which the conversion shown in FIGS. 8A and 8B is applied to a pixel array 5 having the pattern B, in which FIG. 10A shows a yet-to-be-converted pixel array 5a; and FIG. 10B shows a converted pixel array 5b.

FIGS. 11A and 11B are diagrams showing a case in which the conversion shown in FIGS. 8A and 8B is applied to a pixel array 5 having the pattern C, in which FIG. 11A shows a yet-to-be-converted pixel array 5a; and FIG. 11B shows a converted pixel array 5b.

FIGS. 12A and 12B are diagrams showing a case in which the conversion shown in FIGS. 8A and 8B is applied to a pixel array 5 having the pattern D, in which FIG. 12A shows a yet-to-be-converted pixel array 5a; and FIG. 12B shows a converted pixel array 5b.

FIGS. 13A and 13B are diagrams showing an example of conversion of a pixel array 5 by the first conversion circuit 32 according to the first and second embodiments of the present invention and showing conversion in which the pixel array 5 is transposed as a matrix, in which FIG. 13A shows a yet-to-be-converted pixel array 5a; and FIG. 13B shows a converted pixel array 5b.

FIGS. 14A and 14B are diagrams showing a case in which the conversion shown in FIGS. 13A and 13B is applied to a pixel array 5 having the pattern A, in which FIG. 14A shows a yet-to-be-converted pixel array 5a; and FIG. 14B shows a converted pixel array 5b.

FIGS. 15A and 15B are diagrams showing a case in which the conversion shown in FIGS. 13A and 13B is applied to a pixel array 5 having the pattern B, in which FIG. 15A shows a yet-to-be-converted pixel array 5a; and FIG. 15B shows a converted pixel array 5b.

FIGS. 16A and 16B are diagrams showing a case in which the conversion shown in FIGS. 13A and 13B is applied to a pixel array 5 having the pattern C, in which FIG. 16A shows a yet-to-be-converted pixel array 5a; and FIG. 16B shows a converted pixel array 5b.

FIGS. 17A and 17B are diagrams showing a case in which the conversion shown in FIGS. 13A and 13B is applied to a pixel array 5 having the pattern D, in which FIG. 17A shows a yet-to-be-converted pixel array 5a; and FIG. 17B shows a converted pixel array 5b.

FIGS. 18A and 18B are diagrams showing modifications of the pixel arrays 5 whose toggle rate is maximized, in which FIG. 18A shows the pixel array 5 as a pattern A1 (a modification of the pattern A: 4×9); and FIG. 18B shows the pixel array 5 as a pattern B2 (a modification of the pattern B: 4×5).

FIGS. 19A and 19B are diagrams showing cases in which a modification of the conversion shown in FIGS. 8A and 8B is applied to a pixel array 5 having the pattern A2, in which FIG. 19A shows a yet-to-be-converted pixel array 5a; and FIG. 19B shows a converted pixel array 5b.

FIGS. 20A and 20B are diagrams showing a case in which a modification of the conversion shown in FIGS. 13A and 13B is applied to a pixel array 5 having the pattern B2, in which FIG. 20A shows a yet-to-be-converted pixel array 5a; and FIG. 20B shows a converted pixel array 5b.

FIGS. 22A and 22B are diagrams showing an example of conversion of a pixel array 5 by the first conversion circuit 32 according to the first and second embodiments of the present invention and showing conversion in which pixel data of a pixel 50b and pixel data of a pixel 50c are exchanged with one another, in which FIG. 22A shows a yet-to-be-converted pixel array 5a; and FIG. 22B shows a converted pixel array 5b.

FIGS. 23A and 23B are diagrams showing a case in which the conversion shown in FIGS. 22A and 22B is applied to a pixel array 5 whose toggle rate is maximized, in which FIG. 23A shows a yet-to-be-converted pixel array 5a; and FIG. 23B shows a converted pixel array 5b.

FIG. 25 is a function block diagram showing a schematic configuration of a system 1 using an image processing device 3 according to a second embodiment of the present invention.

FIGS. 26A and 26B are diagrams showing a further modification relating to conversion performed by a first conversion circuit 32, in which FIG. 26A shows a yet-to-be-converted pixel array 5a; and FIG. 26B shows a converted pixel array 5b.

FIGS. 27A and 27B are diagrams showing a further modification relating to conversion performed by the first conversion circuit 32, in which FIG. 27A shows a yet-to-be-converted pixel array 5a; and FIG. 27B shows a converted pixel array 5b.

DETAILED DESCRIPTION

Now, embodiments of the present invention will be described in detail with reference to the accompanying drawings.

1. First Embodiment 1.1 System 1 (Overall Configuration)

Figure 1:
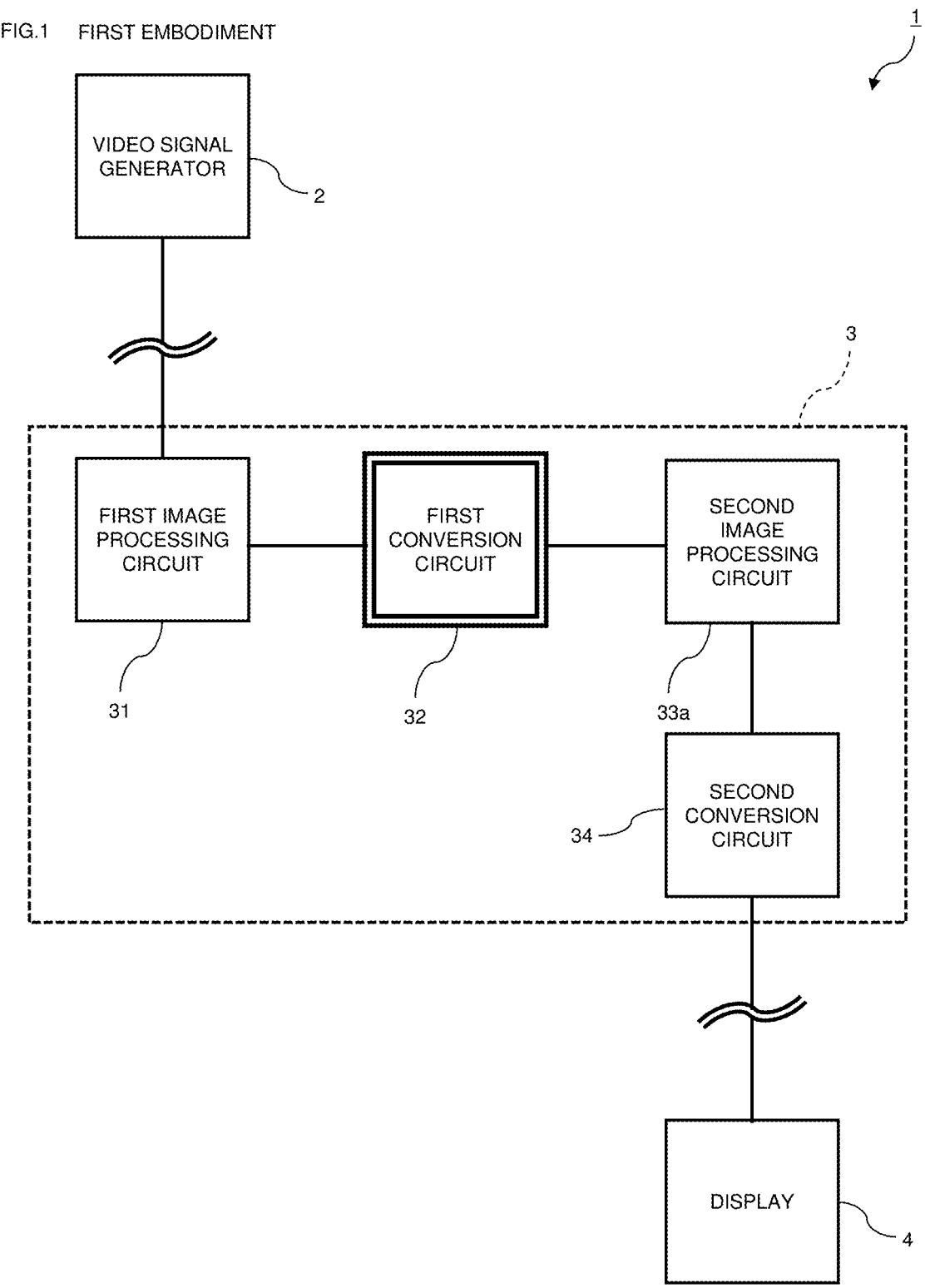
FIG. 1 is a function block diagram showing a schematic configuration of a system 1 using an image processing device 3 according to a first embodiment of the present invention.

FIG. 1 is a function block diagram showing a schematic configuration of a system 1 using an image processing device 3 according to a first embodiment of the present invention. The system 1 includes a video signal generator 2, the image processing device 3, and a display 4.

The video signal generator 2 is a device that generates a video signal, which is a sequence of pixel data including luminance information, color information, and the like, but is not limited to a particular type of device. For example, the video signal generator 2 is a personal computer, vision sensor (camera), moving image reproduction device, or the like. The image processing device 3 receives a video signal outputted from the video signal generator 2 and performs predetermined image processing on the video signal. This image processing is not limited to a particular type of processing and may be gamma correction, gradation correction, luminance correction, or a combination thereof. The image processing device 3 will be described in more detail at Section 1.2. The display 4 is a medium that receives the video signal image-processed by the image processing device 3 and displays it as an image on the basis of pieces of pixel data included therein. The display 4 may be, for example, an LCD monitor, CRT monitor, organic EL monitor, or the like.

1.2 Image Processing Device 3

Next, the image processing device 3 will be described. The image processing device 3 according to the first embodiment includes an image processing circuit, a conversion circuit, and a processor. Specifically, the image processing device 3 includes a first image processing circuit 31 as an image processing circuit, a first conversion circuit 32 as a conversion circuit, and a second image processing circuit 33a as a processor. The system 1 also includes a second conversion circuit 34 as a conversion circuit.

<First Image Processing Circuit 31>

The first image processing circuit 31 is a circuit that performs one of types of image processing that the image processing device 3 is able to perform. The type of image processing performed by the first image processing circuit 31 is not limited to any particular type and may be, for example, gamma processing (particularly, front gamma processing) or filtering that uses a median filter or the like and depends on the arrangement of pixel data. In other words, the first image processing circuit 31 is configured to perform the predetermined type of image processing on the video signal outputted from the video signal generator 2 and then to output a pixel data array relating to the image-processed video signal (an example of "a first pixel data array" in Claims).

In the present specification, the term "circuit" refers to a circuit in a broad-sense realized by appropriately combining at least a circuit, circuitry, a processor, a memory, and the like. That is, the circuit herein includes an application specific integrated circuit (ASIC), a programmable logic device (e.g., simple programmable logic device (SPLD), a complex programmable logic device (CLPD), a field programmable gate array (FPGA), and the like.

<First Conversion Circuit 32>

The first conversion circuit 32 is configured to convert the pixel data array outputted from the first image processing circuit 31 into a different pixel data array (an example of a "second pixel data array" in Claims) by converting the arrangement of pieces of pixel data included in the pixel data array pixel by pixel. This conversion will be described in more detail at Section 1.4.

<Second Image Processing Circuit 33a>

The second image processing circuit 33a is a circuit that performs one of types of image processing that the image processing device 3 is able to perform. Unlike the image processing performed by the first image processing circuit 31, the image processing performed by the second image processing circuit 33a is characterized in that there is a limit to the type of image processing. More specifically, the second image processing circuit 33a receives the pixel data array (second pixel data array) converted from the original pixel data array (first pixel data array) by the first conversion circuit 32 and therefore cannot perform, on this pixel data array, filtering that uses a median filter or the like and depends on the arrangement of the pixel data array or other processing. In summary, the second image processing circuit 33a is configured to output the pixel data array (second pixel data array) subjected to the conversion and predetermined image processing.

<Second Conversion Circuit 34>

The second conversion circuit 34 is configured to convert the pixel data array outputted from the second image processing circuit 33a into the original pixel data array (first pixel data array) by converting the arrangement of pieces of pixel data included in the pixel data array pixel by pixel. That is, the conversion relating to the second conversion circuit 34 can be said to be the reverse of the conversion relating to the first conversion circuit 32. The second conversion circuit 34 then outputs, to the display 4, the video signal having the original pixel data array (first pixel data array) subjected to the two types of image processing.

1.3 Pixel Array Pattern that Maximizes Power Consumption

Next, a pixel array pattern that maximizes power consumption will be described in detail. Before that, the terms "pixel array 5," "pixels 50," and the like will be described.

<Pixel Array 5>

Figure 2:
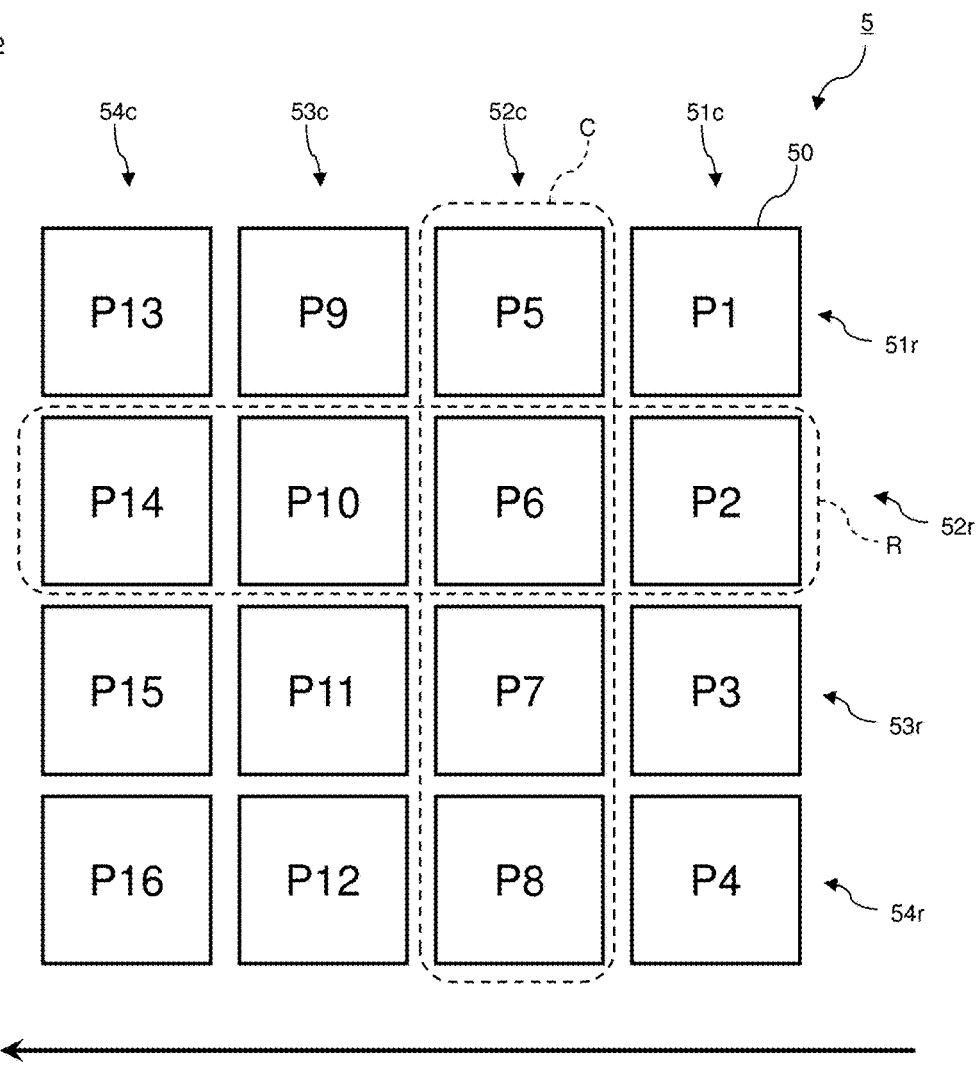
FIG. 2 is a concept diagram showing a pixel array 5 relating to parallel processing and shows a 4×4 two-dimensional pixel array.

FIG. 2 is a concept diagram showing a pixel array 5 relating to parallel processing and shows a two-dimensional pixel array (4×4 matrix) consisting of 4×4 pixels 50. Pieces of pixel data corresponding to the pixels 50 are represented by pixel data P1 to P16. Vertically arranged pixels 50 (e.g., four pixels 50 surrounded by a dotted line C in FIG. 2) in the pixel array 5 are defined as a pixel column. In FIG. 2, pixel columns 51c to 54c are shown. Similarly, horizontally arranged pixels 50 (e.g., four pixels 50 surrounded by a dotted line R in FIG. 2) in the pixel array 5 are defined as a pixel row. In FIG. 2, pixel rows 51r to 54r are shown.

For example, when performing image processing, conversion, or the like, pieces of pixel data of pixels 50 in the same pixel column are processed in parallel in one clock. Specifically, at one time, the pixel data P1 to P4 of the pixels 50 in the pixel column 51c are processed in parallel; upon a lapse of one clock, the pixel data P5 to P8 of the pixels 50 in the pixel column 52c are processed in parallel; upon a lapse of another clock, the pixel data P9 to P12 of the pixels 50 in the pixel column 53c are processed in parallel; and upon a lapse of yet another clock, the pixel data P13 to P16 of the pixels 50 in the pixel column 54c are processed in parallel. In particular, it should be noted that all rows included in the pixel array 5 (four rows in the 4×4 pixel array 5) are processed and then predetermined image processing, conversion, or the like (in particular, conversion relating to the first conversion circuit 32) are performed.

<Pixel 50>

Figure 3:
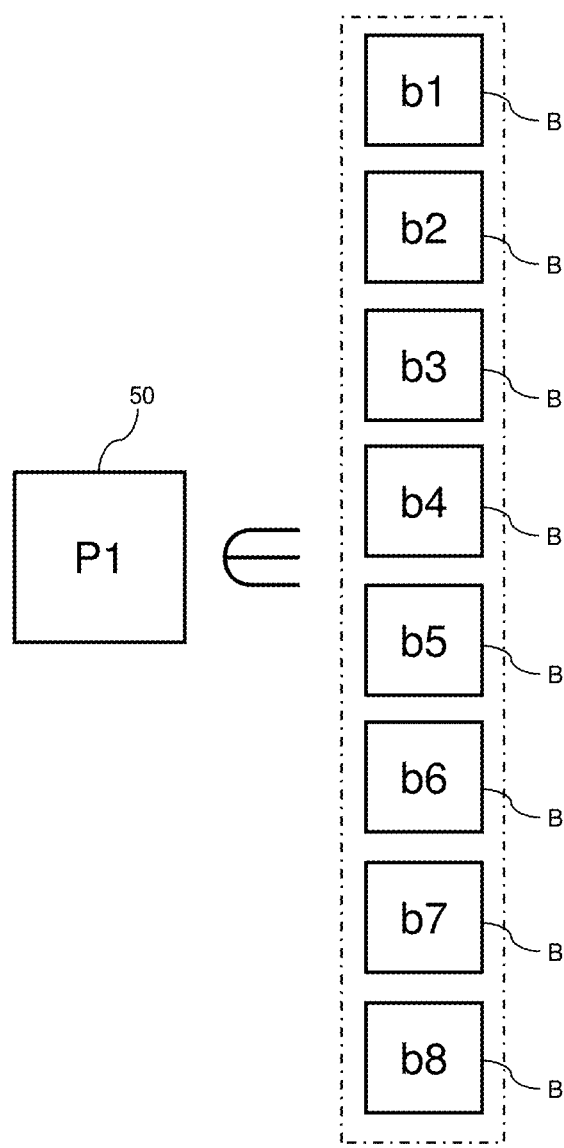
FIG. 3 is a concept diagram showing a pixel 50 and shows monochrome 8-bit pixel 50.

FIG. 3 is a concept diagram showing a pixel 50 and shows a case in which the pixel 50 is 8-bit monochrome. The pixel 50 shown in FIG. 3 has the pixel data P1. The pixel data P1 is represented by a bit string consisting of eight bits B, and the bits B have bit data b1 to b8. The bit data b1 to b8 are each 0 or 1. For example, the bit data b1 corresponds to the 1's place; the bit data b2 to the 2's place; the bit data b3 to the 4's place; the bit data b4 to the 8's place; the bit data b5 to the 16's place; the bit data b6 to the 32's place; the bit data b7 to the 64's place; and the bit data b8 to the 128's place. With respect to these pieces of bit data, information is held or discarded by different eight flip-flops that can be processed in parallel. These pieces of bit data are only illustrative. Depending on the configuration, the pixel data may have 24 bits (in practice, 32 bits) for RGB colors or may have a small amount of information, such as 3 bits.

<Toggle Rate>

FIGS. 4A, 4B, 5A, and 5B are concept diagrams showing the toggle rate about the 8-bit monochrome pixel 50 shown in FIG. 3. Specifically, FIGS. 4A and 4B show cases in which the toggle rate is the highest, FIG. 5A shows a case in which the toggle rate is the lowest, and FIG. 5B shows a case in which the toggle rate is moderate. The term "toggle rate" refers to the rate at which the logic element (a flip-flop in an electronic circuit) toggles relative to the input thereof in each clock. For example, toggling of one input in the order of 0→1→0→1 means that the toggle rate is high and power consumption is high accordingly.

For example, FIG. 4A shows a pixel 50a and a pixel 50b, which are adjacent to one another in the row direction. The pixel 50a has pixel data of 11111111 in binary notation, and 11111111 is 255 in decimal notation and represents white in 8-bit monochrome. The pixel 50b has pixel data of 00000000 in binary notation, and 00000000 is 0 in decimal notation and represents black in 8-bit monochrome. The pixel 50a and pixel 50b are adjacent to one another and therefore when 8-bit flip-flops in one processing system hold information of the bits B of the pixel 50a in one clock, the same flip-flops hold information of the bits B of the pixel 50b in the subsequent clock. Thus, all the 8-bit flip-flops toggle from 1 to 0 (all inversion). In other words, it should be noted that this case is an example in which the bits in exclusive OR of the pixel data relating to the pixels 50a and 50b are all 1 and the toggle rate about the two pixels is the highest.

FIG. 4B shows a pixel 50c and a pixel 50d, which are adjacent to one another in the row direction. The pixel 50c has pixel data of 01100011 in binary notation, and 01100011 is 99 in decimal notation and represents dark-gray in 8-bit monochrome. The pixel 50d has pixel data of 10011100 in binary notation, and 10011100 is 156 in decimal notation and represents light-gray in 8-bit monochrome. The pixel 50c and pixel 50d are adjacent to one another and therefore when 8-bit flip-flops in one processing system hold information of the bits B of the pixel 50c in one clock, the same flip-flops hold information of the bits B of the pixel 50d in the subsequent clock. Thus, all the 8-bit flip-flops toggle into from 1 to 0 or from 0 to 1 (all inversion). In other words, this case is an example in which the bits in exclusive OR of the pixel data relating to the pixels 50c and 50d are all 1 and the toggle rate about the two pixels is the highest.

FIG. 5A shows a pixel 50e and a pixel 50f, which are adjacent to one another in the row direction. Both the pixels 50e and 50f have white pixel data of 11111111 in binary notation (255 in decimal notation). The pixel 50e and pixel 50f are adjacent to one another and therefore when 8-bit flip-flops in one processing system hold information of the bits B of the pixel 50e in one clock, the same flip-flops hold information of the bits B of the pixel 50f in the subsequent clock. Thus, all the 8-bit flip-flops remain 1 (no inversion). In other words, the bits in exclusive OR of the pixel data relating to the pixels 50e and 50f are all 0, meaning that none of 8 bits is inversed. It should be noted that this case is an example in which the toggle rate about the two pixels is the lowest.

FIG. 5B shows a pixel 50g and a pixel 50h, which are adjacent to one another in the row direction. The pixel 50g has white pixel data of 11111111 in binary notation (255 in decimal notation). The pixel 50h has dark-gray pixel data of 01100011 in binary notation (99 in decimal notation). The pixel 50g and pixel 50h are adjacent to one another and therefore when 8-bit flip-flops in one processing system hold information of the bits B of the pixel 50g in one clock, the same flip-flops hold information of the bits B of the pixel 50h in the subsequent clock. Thus, the flip-flops of 4 bits of 8 bits toggle from 1 to 0 or from 0 to 1, and the remaining 4 bits remain 1 (partial inversion). In other words, this case is an example in which 4 bits of 8 bits in exclusive OR of the pixel data relating to the pixels 50g and 50h are 0, the remaining 4 bits are 1, and the toggle rate about the two pixels is moderate.

Next, a case is considered in which power consumption with respect to the 4×4 pixel array 5 is the highest. More specifically, a case is considered in which white pixels and black pixels or light-gray pixels and dark-gray pixels as described above appear alternately in each pixel row (that is, all pixels adjacent in the row direction are inverted). FIGS. 6A and 6B are diagrams showing examples of a pixel array 5 where the light-gray pixels and dark-gray pixels alternately appear, in which FIG. 6A shows the pixel array 5 as a pattern A; and FIG. 6B shows the pixel array 5 as a pattern B. FIGS. 7A and 7B are diagrams showing examples of a pixel array 5 including both pixel rows in which white pixels and black pixels alternately appear and pixel rows in which light-gray pixels and dark-gray pixels alternately appear, in which FIG. 7A shows the pixel array 5 as a pattern C; and FIG. 7B shows the pixel array 5 as a pattern D.

Since the pixels are not limited to 8-bit monochrome, the bits B shown in FIGS. 3, 4A, 4B, 5A, and 5B are not shown. This also applies to the later diagrams. In the following Section 1.4, there will be described changes in power consumption when predetermined conversion is performed on pixel arrays 5 having the patterns A and B.

1.4 Conversion by First Conversion Circuit 32

Conversion performed by the first conversion circuit 32 will be described below. Note that any technique may be used to perform the conversion described below. Examples of the technique include a look-up table and matrix operation used in typical information processing. However, most of data handled in image processing is the enormous number of pixels 50 and therefore matrix operation (that is, geometric transformation) is preferred to a look-up table in terms of throughput or real-time property.

<Conversion Example 1>

FIGS. 8A and 8B are diagrams showing an example of conversion of a pixel array 5 by the first conversion circuit 32 according to the first and second embodiments of the present invention and showing conversion in which pieces of pixel data in a pixel column 52c and pieces of pixel data in a pixel column 53c are exchanged with one another. Specifically, FIG. 8A shows a yet-to-be-converted pixel array 5a, and FIG. 8B shows a converted pixel array 5b. That is, this conversion is geometrical transformation in which a 4×2 partial pixel array 5s consisting of the pixel columns 52c and 53c is symmetrically transformed with respect to a symmetrical axis (see FIGS. 8A and 8B). Note that this conversion is generalized so that pixel arrays 5 having longer rows and the like are included, by sequentially exchanging the (3k−1)th column data and the (3k)th column data with one another where 1≤k≤[N/3] and [ ] is Gauss's notation (see a modification described below).

FIGS. 9A and 9B are diagrams showing a case in which the conversion shown in FIGS. 8A and 8B is applied to a pixel array 5 having the pattern A. Specifically, FIG. 9A shows a yet-to-be-converted pixel array 5a, and FIG. 9B shows a converted pixel array 5b. Referring to pixels 50 in the yet-to-be-converted pixel array 5a, pieces of pixel data in each pixel row make a transition in the order of light- →dark→light→dark (or dark→light→dark→light). This means that the power consumption of the first image processing circuit 31 is high. On the other hand, referring to pixels 50 in the converted pixel array 5b, pieces of pixel data in each pixel row make a transition in the order of light- →light→dark→dark (or dark→dark→light→light). This means that the frequency with which the pieces of pixel data are inverted between dark and light (all the bits B are inversed) is reduced compared to that of the yet-to-be- converted 5a (all inversion in each pixel row: three times→once). That is, the power consumption of the second image processing circuit 33a has been reduced compared to that of the first image processing circuit 31.

FIGS. 10A and 10B are diagrams showing a case in which the conversion shown in FIGS. 8A and 8B is applied to a pixel array 5 having the pattern B. Specifically, FIG. 10A shows a yet-to-be-converted pixel array 5a, and FIG. 10B shows a converted pixel array 5b. Referring to pixels 50 in the yet-to-be-converted pixel array 5a, pieces of pixel data in each pixel row make a transition in the order of light- →dark→light→dark. This means that the power consumption of the first image processing circuit 31 is high. Referring to pixels 50 in the converted pixel array 5b, pieces of pixel data in each pixel row make a transition in the order of light→light→dark→dark. This means that the frequency with which the pieces of pixel data are inverted between dark and light (all the bits B are inversed) is reduced compared to that of the yet-to-be-converted 5a (all inversion in each pixel row: three times→once). That is, the power consumption of the second image processing circuit 33a has been reduced compared to that of the first image processing circuit 31.

FIGS. 11A and 11B are diagrams showing a case in which the conversion shown in FIGS. 8A and 8B is applied to a pixel array 5 having the pattern C. Specifically, FIG. 11A shows a yet-to-be-converted pixel array 5a, and FIG. 11B shows a converted pixel array 5b. Referring to pixels 50 in the yet-to-be-converted pixel array 5a, pieces of pixel data in a pixel row 51r (pixel row 52r) make a transition in the order of light→dark→light→dark (dark→light→dark- →light), and pieces of pixel data in a pixel row 53r (pixel row 54r) make a transition in the order of white→black- →white→black (black→white→black→white) This means that the power consumption of the first image processing circuit 31 is high. On the other hand, referring to pixels 50 in the converted pixel array 5b, the pieces of pixel data in the pixel row 51r (pixel row 52r) make a transition in the order of light→light→dark→dark (dark→dark→light→light), and the pieces of pixel data in the pixel row 53r (pixel row 54r) make a transition in the order of white→white→black- →black (black→black→white→white). This means that the frequency with which the pieces of pixel data are inversed between dark and light or white and black (all the bits B are inversed) is reduced compared to that of the yet-to-be- converted 5a (all inversion in each pixel row: three times→once). That is, the power consumption of the second image processing circuit 33a has been reduced compared to that of the first image processing circuit 31.

FIGS. 12A and 12B are diagrams showing a case in which the conversion shown in FIGS. 8A and 8B is applied to a pixel array 5 having the pattern D. Specifically, FIG. 12A shows a yet-to-be-converted pixel array 5a, and FIG. 12B shows a converted pixel array 5b. Referring to pixels 50 in the yet-to-be-converted pixel array 5a, pieces of pixel data in pixel rows 51r and 53r make a transition in the order of light→dark→light→dark, and pieces of pixel data in pixel rows 52r and 54r make a transition in the order of white- →black→white→black. This means that the power consumption of the first image processing circuit 31 is high. On the other hand, referring to pixels 50 in the converted pixel array 5b, the pieces of pixel data in the pixel rows 51r and 53r make a transition in the order of light→light→dark- →dark, and the pieces of pixel data in the pixel rows 52r and 54r make a transition in the order of white→white→black- →black. This means that the frequency with the pieces of pixel data are inverted between dark and light or white and black (all the bits B are inversed) is reduced compared to that of the yet-to-be-converted 5*a* (all inversion in each pixel row: three times→once). That is, the power consumption of the second image processing circuit 33*a* has been reduced compared to that of the first image processing circuit 31.

By using the first conversion circuit 32 in these manners with respect to the above patterns A to D, the state in which the power consumption of the first image processing circuit 31 and the power consumption of the second image processing circuit 33*a* are maximized simultaneously is suppressed even when the pixel array 5 having the pattern whose power consumption is originally high is processed.

<Conversion Example 2>

FIGS. 13A and 13B are diagrams showing an example of conversion of a pixel array 5 by the first conversion circuit 32 according to the first and second embodiments of the present invention and showing conversion in which the pixel array 5 is transposed as a matrix. Specifically, FIG. 13A shows a yet-to-be-converted pixel array 5*a*, and FIG. 13B shows a converted pixel array 5*b*. That is, this conversion is geometrical transformation in which the pixel array 5*a* is symmetrically converted with respect to a symmetrical axis (see FIGS. 13A and 13B). Note that when this conversion is generalized so that a larger pixel array 5 or the like is included, by transposing all of the pixel array 5 or a partial pixel array included therein as a matrix (see a modification described below).

FIGS. 14A and 14B are diagrams showing a case in which the conversion shown in FIGS. 13A and 13B is applied to a pixel array 5 having the pattern A. Specifically, FIG. 14A shows a yet-to-be-converted pixel array 5*a*, and FIG. 14B shows a converted pixel array 5*b*. As shown, although the pieces of pixel data of the pixel array 5 having the pattern A have subjected to this conversion, none of them has been changed (the pixel arrays 5*a* and 5*b* are the same).

FIGS. 15A and 15B are diagrams showing a case in which the conversion shown in FIGS. 13A and 13B is applied to a pixel array 5 having the pattern B. Specifically, FIG. 15A shows a yet-to-be-converted pixel array 5*a*, and FIG. 15B shows a converted pixel array 5*b*. Referring to pixels 50 in the yet-to-be-converted pixel array 5*a*, pieces of pixel data in each pixel row make a transition in the order of light-→dark→light→dark. This means that the power consumption of the first image processing circuit 31 is high. On the other hand, referring to pixels 50 in the converted pixel array 5*b*, pieces of pixel data in each pixel row make a transition without being inverted between dark and light (all inversion in each pixel row: three times→zero time). That is, the power consumption of the second image processing circuit 33*a* has been significantly reduced compared to that of the first image processing circuit 31.

FIGS. 16A and 16B are diagrams showing a case in which the conversion shown in FIGS. 13A and 13B is applied to a pixel array 5 having the pattern C. Specifically, FIG. 16A shows a yet-to-be-converted pixel array 5*a*, and FIG. 16B shows a converted pixel array 5*b*. Referring to pixels 50 in the yet-to-be-converted pixel array 5*a*, pieces of pixel data in a pixel row 51*r* (pixel row 52*r*) make a transition in the order of light→dark→light→dark (dark→light→dark-→light), and pieces of pixel data in a pixel row 53*r* (pixel row 54*r*) make a transition in the order of white→black-→white→black (black→white→black→white). This means that the power consumption of the first image processing circuit 31 is high. On the other hand, referring to the pixels 50 in the converted pixel array 5*b*, the pieces of pixel data in the pixel rows 51*r* and 53*r* make a transition in the order of light→dark→white→black, and the pieces of pixel data in the pixel rows 52*r* and 54*r* make a transition in the order of dark→light→black→white. This means that the frequency with which the pieces of pixel data are inverted between dark and light or white and black (all the bits B are inversed) is reduced compared to that of the yet-to-be-converted 5*a* (all inversion in each pixel row: three times→twice (partial inversion: once)). That is, the power consumption of the second image processing circuit 33*a* has been slightly reduced compared to that of the first image processing circuit 31.

FIGS. 17A and 17B are diagrams showing a case in which the conversion shown in FIGS. 13A and 13B is applied to a pixel array 5 having the pattern D. Specifically, FIG. 17A shows a yet-to-be-converted pixel array 5*a*, and FIG. 17B shows a converted pixel array 5*b*. Referring to pixels 50 in the yet-to-be-converted pixel array 5*a*, pieces of pixel data in pixel rows 51*r* and 53*r* make a transition in the order of light→dark→light→dark, and pieces of pixel data in pixel rows 52*r* and 54*r* make a transition in the order of white-→black→white→black. This means that the power consumption of the first image processing circuit 31 is high. On the other hand, referring to pixels 50 in the converted pixel array 5*b*, the pieces of pixel data in the pixel rows 51*r* and 53*r* make a transition in the order of light→white→light-→white, and the pieces of pixel data in the pixel rows 52*r* and 54*r* make a transition in the order of dark→black→dark-→black. This means that the frequency with which the pieces of pixel data are inversed between dark and light or white and black (all the bits B are inversed) is reduced compared to that of the yet-to-be-converted 5*a* (all inversion in each pixel row: three times→zero time (partial inversion: three times)). That is, the power consumption of the second image processing circuit 33*a* has been reduced to some extent compared to that of the first image processing circuit 31.

By using the first conversion circuit 32 in these manners with respect to the patterns A to D, no advantageous effects are produced with respect to the pattern A, while power consumption is expected to be reduced with respect to the patterns B to D although there are differences in advantageous effects thereamong. In particular, power consumption is expected to be significantly reduced with respect to the pattern B. From a probability viewpoint, the probability that the power consumption of the first image processing circuit 31 and the power consumption of the second image processing circuit 33*a* are maximized simultaneously is reduced even when the first conversion circuit 32 processes a pixel array 5 having a pattern whose power consumption is originally high. When power consumption is maximized simultaneously, a larger load is imposed on the circuit and thus there can occur problems such as shortening the life of the circuit. By reducing such probability, an advantageous effect of prolonging the life of the circuit itself is expected to be obtained.

1.5 Generalization of Conversion Examples 1 and 2

In the above embodiment, the case has been described in which the pieces of pixel data of the pixels 50 in one pixel column of the 4×4 pixel array 5 are processed in parallel. This conversion is generalized by processing an M×N (M≥2 and N≥2) pixel array 5 in parallel. For example, FIGS. 18A and 18B show modifications of a pixel array 5 having the highest toggle rate, in which FIG. 18A shows the modification as a pattern A2 (a modification of the pattern A: 4×9); and FIG. 18B shows the modification as a pattern B2 (a modification of the pattern B: 4×5). Conversion most suitable to these modifications will be described below.

FIGS. 19A and 19B are diagrams showing a case in which a modification of the conversion shown in FIGS. 8A and 8B is applied to a pixel array 5 having the pattern A2. Specifically, FIG. 19A shows a yet-to-be-converted pixel array 5a, and FIG. 19B shows a converted pixel array 5b. As shown, this conversion is a modification of the above conversion example 1. This conversion includes exchanging pieces of pixel data in a pixel column 52c and pieces of pixel data in a pixel column 53c with one another, then exchanging pieces of pixel data in a pixel column 55c and pieces of pixel data in a pixel column 56c with one another, and then exchanging pieces of pixel data in a pixel column 58c and pieces of pixel data in a pixel column 59c with one another. That is, this conversion is geometrical transformation in which a 4×2 partial pixel array 5s consisting of the pixel columns 52c and 53c, a 4×2 partial pixel array 5t consisting of the pixel columns 55c and 56c, and a 4×2 partial pixel array 5u consisting of the pixel columns 58c and 59c are symmetrically converted in the row direction.

Referring to pixels 50 in the yet-to-be-converted pixel array 5a, pieces of pixel data in each pixel row make a transition in the order of light→dark→light→dark→light-→dark→light→dark→light (or, dark→light→dark→light-→dark→light→dark→light→dark). This means that the power consumption of the first image processing circuit 31 is high. On the other hand, referring to the pixels 50 in the converted pixel array 5a, the pieces of pixel data in each pixel row make a transition in the order of light→light-→dark→dark→dark→light→light→light→dark (or, dark-→dark→light→light→light→dark→dark→dark→light). This means that the frequency with which the pieces of pixel data are inverted between dark and light (all the bits B are inversed) is reduced compared to that of the yet-to-be-converted 5a (all inversion in each pixel row: eight times-→three times). That is, the power consumption of the second image processing circuit 33a has been reduced compared to that of the first image processing circuit 31.

FIGS. 20A and 20B are diagrams showing a case in which a modification of the conversion shown in FIGS. 13A and 13B is applied to a pixel array 5 having the pattern B2. Specifically, FIG. 20A shows a yet-to-be-converted pixel array 5a, and FIG. 20B shows a converted pixel array 5b. As shown, this conversion is a modification of the above conversion example 2 and includes transposing a 4×4 partial pixel array 5v consisting of pixel columns 51c to 54c of the pixel array 5 (a pixel column 55c is not converted). That is, this conversion is geometrical transformation in which the partial pixel array 5v is symmetrically converted with respect to a diagonal line.

Referring to pixels 50 in the yet-to-be-converted pixel array 5a, pieces of pixel data in each pixel row make a transition in the order of light→dark→light→dark→light. This means that the power consumption of the first image processing circuit 31 is high. On the other hand, referring to the pixels 50 in the converted pixel array 5b, the pieces of pixel data in the pixel rows 51r and 53r make a transition without being inverted between dark and light, and the pieces of pixel data in the pixel rows 52r and 54r make a transition in the order of dark→dark→dark→dark→light. This means that the frequency with which the pieces of pixel data are inverted between dark and light (all the bits B are inversed) is reduced compared to that of the yet-to-be-converted 5a (all inversion in each pixel row: four times→zero time or once). That is, the power consumption of the second image processing circuit 33a has been significantly reduced compared to that of the first image processing circuit 31.

1.6 Serial Processing

Figure 21:
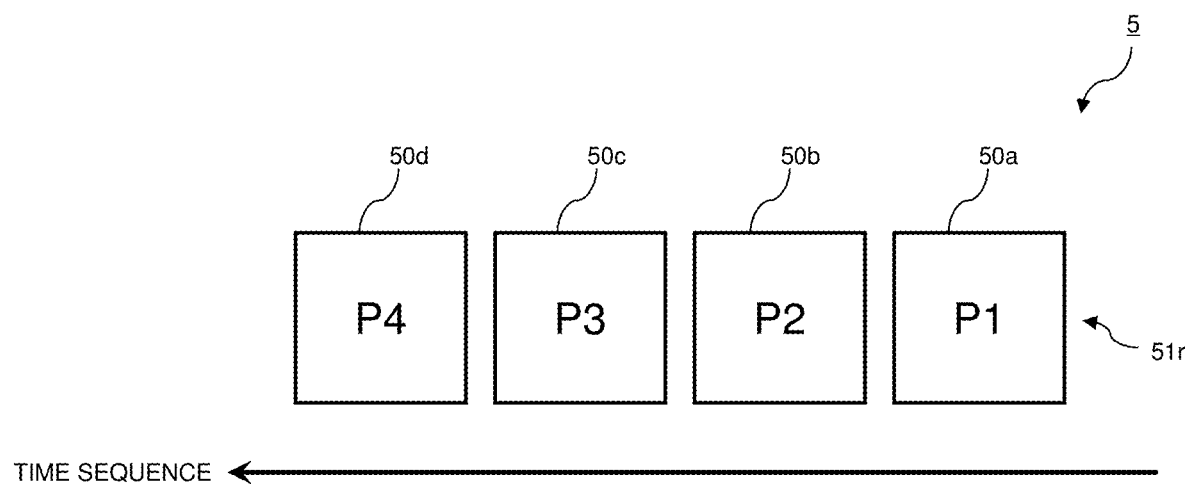
FIG. 21 is a concept diagram showing a pixel array 5 relating to serial processing and shows a one-dimensional pixel array consisting of 4 pixels.

In the above embodiment, the case has been described in which the pieces of pixel data of the pixels 50 in one pixel column are processed in parallel. However, the pieces of pixel data may be processed in serial as long as the pieces of pixel data are processed pixel by pixel. This serial processing is generalized by processing an M×N (M≥1 and N≥2) pixel array 5 in serial. FIG. 21 is a concept diagram showing a pixel array 5 relating to serial processing and shows a one-dimensional pixel array consisting of 4 pixels. An example in which such a pixel array 5 is converted by the first conversion circuit 32 will be described below.

<Conversion Example 3→

FIGS. 22A and 22B are diagrams showing an example of conversion of a pixel array 5 by the first conversion circuit 32 according to the first and second embodiments of the present invention and showing conversion in which pixel data of a pixel column 50b and pixel data of a pixel column 50c are exchanged with one another. Specifically, FIG. 22A shows a yet-to-be-converted pixel array 5a, and FIG. 22B shows a converted pixel array 5b. That is, this conversion is application of the above conversion example 1 to serial processing.

A conceivable case in which the power consumption of the pixel array 5 relating to serial processing is maximized is a pattern in which the pixel data is repeatedly inverted between dark and light in each clock. FIGS. 23A and 23B are diagrams showing a case in which the conversion shown in FIGS. 22A and 22B is applied to such a pixel array 5. Specifically, FIG. 23A shows a yet-to-be-converted pixel array 5a, and FIG. 23B shows a converted pixel array 5b. Referring to pixels 50 in the converted pixel array 5b, pieces of pixel data make a transition in the order of light→light-→dark→dark. This means that the frequency with which the pieces of pixel data are inverted between dark and light is reduced compared to that of the yet-to-be-converted pixel array 5a. That is, the power consumption of the second image processing circuit 33a has been reduced compared to that of the first image processing circuit 31. In serial processing of 8 pixels, light→dark→light→dark→light-→dark→light→dark may be converted into light→light-→light→light→dark→dark→dark→dark. For example, the (2k)th data and the (2k+3)th data may be exchanged with one another (k=1, 2).

By using the first conversion circuit 32 in this manner even in serial processing, the state in which the power consumption of the first image processing circuit 31 and the power consumption of the second image processing circuit 33a are maximized simultaneously is suppressed even when the first conversion circuit 32 processes a pixel array 5 having a pattern whose power consumption is originally high.

1.7 Flow of Operation

Figure 24:
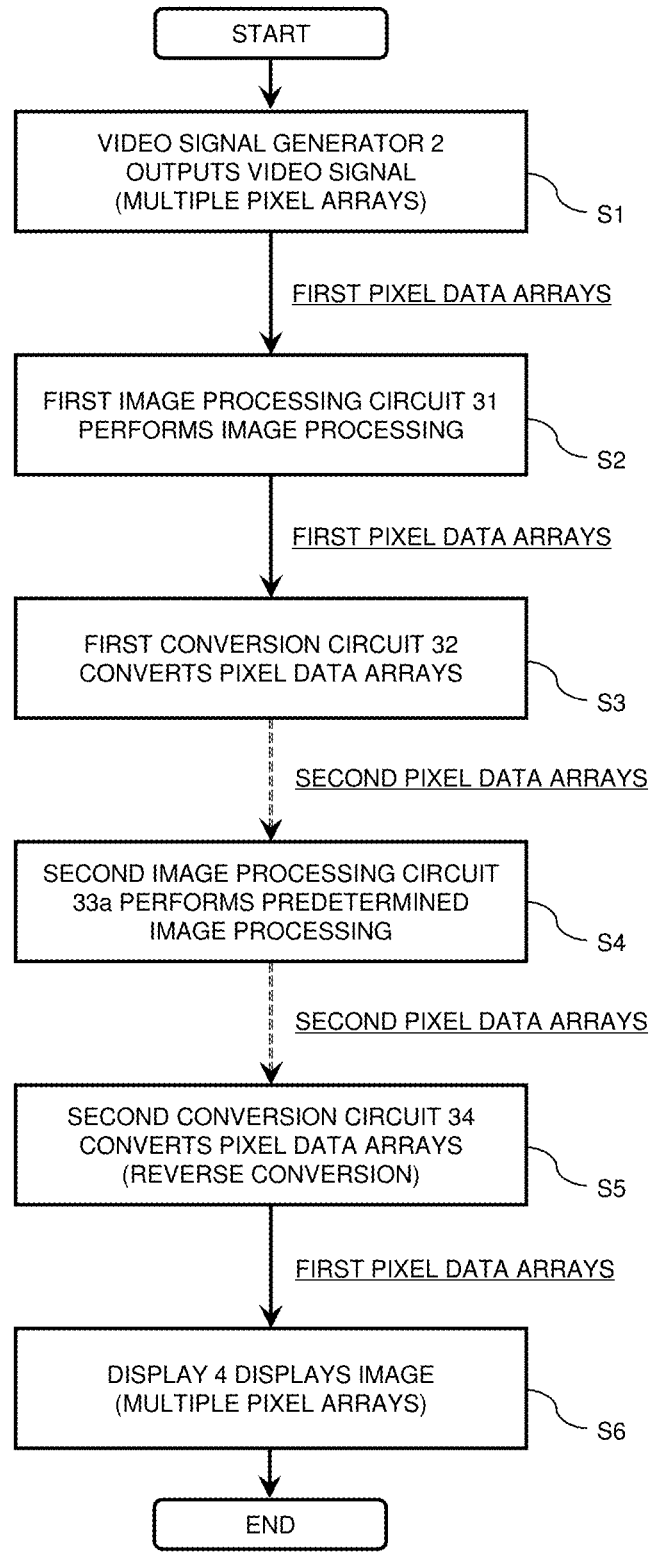
FIG. 24 is a flowchart showing the flow of the operation of the system 1 using the image processing device 3 according to the first embodiment of the present invention.

The operation of the system 1 having the above configuration and features will be described below. FIG. 24 is a flowchart showing the flow of the operation of the system 1 using the image processing device 3 according to the first embodiment of the present invention. Hereafter, steps S1 to S6 relating to the operation of the system 1 will be described with reference to FIGS. 1 and 24.

[Start]

Step S1

The video signal generator 2 (e.g., a camera or moving image reproduction device, etc.) outputs a video signal. This video signal is an aggregate of the pixel arrays 5 described above, and each pixel array 5 includes a first pixel data array. As used herein, the term "first pixel data array" refers to a state in which a pixel data array that the original video signal should hold as an image is maintained. Since image processing or conversion is intensively continued in steps S2 to S5, the video signal is preferably raw data, which has yet to be compressed (continue to step S2).

Step S2

The first image processing circuit 31 receives the pixel data arrays, performs predetermined image processing, such as front gamma processing, on the pixel data arrays, and outputs the image-processed pixel data arrays to the subsequent stage. This image processing may be of any type as long as it is performed pixel by pixel. Although the pieces of pixel data in the pixel arrays 5 have been changed due to the image processing, the pixel data arrays that the video signal originally should hold as an image are maintained. For this reason, each pixel array 5 still includes the first pixel data array (continue to S3).

Step S3

The first conversion circuit 32 receives the pixel data arrays and performs the above conversion (e.g., conversion example 1) on the pixel data arrays. That is, the pixel data arrays in the pixel arrays 5 are converted from the first pixel data arrays into the second pixel data arrays (continue to step S4).

Step S4

The second image processing circuit 33a receives the pixel data arrays, performs predetermined image processing, such as rear gamma processing, on the pixel data arrays, and outputs the image-processed pixel data arrays to the subsequent stage. Since this image processing is performed on the second pixel data arrays, it is limited to image processing which does not depend on the positional relationships among the pieces of pixel data. Each pixel array 5 includes the second pixel data array (continue to S5).

Step S5

The second conversion circuit 34 receives the pixel data arrays and performs the reverse of the conversion performed by the first conversion circuit 32 on the pixel data arrays. That is, the pixel data arrays in the pixel arrays 5 are reconverted from the second pixel data arrays into the first pixel data arrays (continue to step S6).

Step S6

The second conversion circuit 34 then transmits the image-processed pixel arrays including the first pixel data arrays to the display 4, which then displays the pixel arrays as an image. [End]

2. Second Embodiment

FIG. 25 is a function block diagram showing a schematic configuration of a system 1 using an image processing device 3 according to a second embodiment of the present invention. It should be noted that although, as in the first embodiment, the system 1 includes a video signal generator 2, an image processing device 3, and a display 4, it differs from that of the first embodiment in the configuration of the image processing device 3. More specifically, in the image processing device 3 according to the second embodiment, a first conversion circuit 32 and a second conversion circuit 34 are connected to one another through a communication bus 33b and a second image processing circuit 33a is not provided therebetween.

The communication bus 33b transmits information pixel by pixel. For example, the communication bus 33b adjusts the timings of the pixel data arrays using flip-flops. Thus, by performing various types of pixel-by-pixel conversion (see Sections 1.4 to 1.6) using the first conversion circuit 32, the state in which or the probability that the power consumption of the first image processing circuit 31 and the power consumption of the communication bus 33b are maximized simultaneously is suppressed or reduced. Of course, an additional image processing circuit or the like (not shown) may be provided in the subsequent stage of the second conversion circuit 34.

3. Other Embodiments

The above types of conversion are only illustrative and are not limiting. Any type of conversion may be performed as long as the pixel data arrays (first pixel data arrays) that maximize the power consumption of the first image processing circuit 31 and the power consumption of the second image processing circuit 33a simultaneously are converted into different pixel data arrays (second pixel data arrays) that make the power consumption equal to or lower than the maximum power consumption. For example, conversion may be performed such that pieces of column data are exchanged with one another, in particular, such that pieces of adjacent column data are exchanged with one another. Also, conversion may be performed such that some identification bit is provided on the top column data of each pixel array 5 and an appropriate one of the multiple conversion examples is selectively performed on the basis of the identification bits. However, the first conversion circuit 32 itself also consumes power and therefore a simple configuration is preferred. On the other hand, there are, of course, pixel data arrays that require higher power consumption after being converted than before being converted. However, even such pixel data arrays can be said to have no influence on the reduction in the probability that the power consumption will be maximized simultaneously.

The pixels may be rearranged in accordance with a predetermined rule. For example, FIGS. 26A, 26B, 27A, and 27B are diagrams showing a further conversion examples relating to conversion performed by the first conversion circuit 32. Specifically, FIGS. 26A and 27A show yet-to-be-converted pixel arrays 5a, and FIGS. 26B and 27B show converted pixel arrays 5b. It can be confirmed that conversion according to such a rule also allows the power consumption of the second image processing circuit 33a to be reduced compared to that of the first image processing circuit 31.

Yet another aspect of the present invention can provide an image processing program that causes a computer to function as an image processing circuit, a conversion circuit configured to receive a first pixel data array outputted from the image processing circuit and to convert the first pixel data array into a second pixel data array by converting an arrangement of pieces of pixel data included in the first pixel data array pixel by pixel, the first pixel data array being an aggregate of multiple pieces of pixel data, the pieces of pixel data being pieces of data corresponding to multiple pixels, each of the pieces of pixel data including multiple bits, an aggregate of the pixels forming a pixel array, and a processing unit configured to receive the second pixel data array outputted from the conversion circuit.

There may be also provided a computer-readable non-transitory storage medium having the functions of this program implemented thereon. This program may be distributed through the Internet or the like. The components of the system 1 may be included the same case or may be disposed in multiple cases in a distributed manner.

4. Conclusion

As seen above, according to the above embodiments, image processing devices and image processing methods can be provided which reduce the probability that the power consumption of two processing systems will be maximized simultaneously. Note that the minimum power consumption of the circuit configurations of the above embodiments is approximately the same as that of a circuit configuration without the first conversion circuit 32. For example, when the above image processing devices according to the above embodiments receive a solid-black or solid-white image (an image consisting of only black or white pixels), which consumes the minimum power, and convert the arrangement of the pieces of pixel data of the image pixel by pixel, they would output the solid-black or solid-white image. For this reason, the minimum power consumption is approximately the same.

While the various embodiments according to the present invention have been described, the embodiments are only illustrative and are not intended to limit the scope of the invention. The novel embodiments can be carried out in other various aspects, and various omissions, replacements, or changes can be made thereto without departing from the spirit of the invention. The embodiments and modifications thereof are included in the spirit and scope of the present invention, as well as included in the scope of the invention set forth in Claims and equivalents thereof.

REFERENCE SIGNS LIST

1: system
2: video signal generator
3: image processing device
31: first image processing circuit
32: first conversion circuit
33*a*: second image processing circuit
33*b*: communication bus
34: second conversion circuit
4: display
5: pixel array
5*a*: pixel array
5*b*: pixel array
5*s*: partial pixel array
5*t*: partial pixel array
5*u*: partial pixel array
5*v*: partial pixel array
50: pixel
50*a*: pixel
50*b*: pixel
50*c*: pixel
50*d*: pixel
50*e*: pixel
50*f*: pixel
50*g*: pixel
50*h*: pixel
51*c*: pixel column
52*c*: pixel column
53*c*: pixel column
54*c*: pixel column
55*c*: pixel column
56*c*: pixel column
58*c*: pixel column
59*c*: pixel column
51*r*: pixel row
52*r*: pixel row
53*r*: pixel row
54*r*: pixel row
P1: pixel data
P10: pixel data
P11: pixel data
P12: pixel data
P13: pixel data
P14: pixel data
P15: pixel data
P16: pixel data
P2: pixel data
P3: pixel data
P4: pixel data
P5: pixel data
P6: pixel data
P7: pixel data
P8: pixel data
P9: pixel data
b1: bit data
b2: bit data
b3: bit data
b4: bit data
b5: bit data
b6: bit data
b7: bit data
b8: bit data

The invention claimed is:

1. A image processing device comprising:
a first image processing circuit;
a first conversion circuit configured to receive a first pixel data array outputted from the first image processing circuit and to convert the first pixel data array into a second pixel data array by converting an arrangement of pieces of pixel data included in the first pixel data array pixel by pixel,
the first and the second pixel data array each being an aggregate of a plurality of pieces of pixel data,
the pieces of pixel data being data corresponding to pieces of pixels, the pixel data comprising a plurality of bits,
an aggregate of the pixels forming a pixel array;
a second image processing circuit configured to perform, on the second pixel data array outputted from the first conversion circuit, image processing that does not depend on positional relationships among pieces of pixel data in the second pixel data array; and
a second conversion circuit configured to receive the second pixel data array processed by the second image processing circuit and to reconvert the second pixel data array into the first pixel data array, wherein
the pixel array is a two-dimensional array comprising M×N pixels, M satisfying M≥2, N satisfying N≥2, and
the first conversion circuit is configured to perform the converting by processing M pieces of pixel data in parallel N times, the M pieces of pixel data being column data,
the first conversion circuit is configured to convert, being independent to pixel arrangements of the first pixel data array, the first pixel data array into the second pixel data array by transposing a square matrix of p rows and p columns that is all or part of the first pixel data array, p satisfying p≤M and p≤N,
the square matrix has a plurality of matrix elements each corresponding to the pixel data of the first pixel data array, in the transposing the square matrix, each of the matrix elements in row i and column j is swapped to a position in row j and column i, i and j satisfying $0 \leq i \leq p$, and $0 \leq j \leq p$.

2. The image processing device of claim 1, wherein M=N is satisfied.

3. An image processing method comprising:
a first image processing step;
a first conversion step of converting a first pixel data array outputted in the first image processing step into a second pixel data array by converting an arrangement of pieces of pixel data included in the first pixel data array pixel by pixel,
the first and the second pixel data array each being an aggregate of a plurality of pieces of pixel data,
the pieces of pixel data being data corresponding to pieces of pixels, the pixel data comprising a plurality of bits,
an aggregate of the pixels forming a pixel array;
a second processing step of performing, on the second pixel data array outputted from the first conversion step, image processing that does not depend on positional relationships among pieces of pixel data in the second pixel data array; and
a second conversion step of receiving the second pixel data array processed in the second processing step and reconverting the second pixel data array into the first pixel data array, wherein
the pixel array is a two-dimensional array comprising M×N pixels, M satisfying M≥2, N satisfying N≥2, and
the converting in the first conversion step comprises processing M pieces of pixel data in parallel N times, the M pieces of pixel data being column data,
converting, being independent to pixel arrangements of the first pixel data array, the first pixel data array into the second pixel data array by transposing a square matrix of p rows and p columns that is all or part of the first pixel data array, p satisfying p≤M and p≤N,
the square matrix has a plurality of matrix elements each corresponding to the pixel data of the first pixel data array,
in the transposing the square matrix, each of the matrix elements in row i and column j is swapped to a position in row j and column i, i and j satisfying $0 \leq i \leq p$, and $0 \leq j \leq p$.

4. A image processing device comprising:
an image processing circuit;
a first conversion circuit configured to receive a first pixel data array outputted from the image processing circuit and to convert the first pixel data array into a second pixel data array by converting an arrangement of pieces of pixel data included in the first pixel data array pixel by pixel,
the first and the second pixel data array each being an aggregate of a plurality of pieces of pixel data,
the pieces of pixel data being data corresponding to pieces of pixels, the pixel data comprising a plurality of bits,
an aggregate of the pixels forming a pixel array;
a processing unit configured to process the second pixel data array outputted from the first conversion circuit; and
a second conversion circuit configured to receive the second pixel data array processed by the processing unit and to reconvert the second pixel data array into the first pixel data array, wherein
the pixel array is a two-dimensional array comprising M×N pixels, M satisfying M≥2, N satisfying N≥2, and
the first conversion circuit is configured to perform the converting by processing M pieces of pixel data in parallel N times, the M pieces of pixel data being column data,
the first conversion circuit is configured to convert, being independent to pixel arrangements of the first pixel data array, the first pixel data array into the second pixel data array by transposing a square matrix of p rows and p columns that is all or part of the first pixel data array, p satisfying p≤M and p≤N,
the square matrix has a plurality of matrix elements each corresponding to the pixel data of the first pixel data array,
in the transposing the square matrix, each of the matrix elements in row i and column j is swapped to a position in row j and column i, i and j satisfying $0 \leq i \leq p$, and $0 \leq j \leq p$.

* * * * *